United States Patent
Fong et al.

(10) Patent No.: US 11,405,887 B2
(45) Date of Patent: *Aug. 2, 2022

(54) POWER ALLOCATION AT WIRELESS NETWORK COVERAGE EDGE

(71) Applicant: AT&T Intellectual Property I, L.P., Atlanta, GA (US)

(72) Inventors: Tsz H. Fong, Rahway, NJ (US); James Gordon Beattie, Jr., Bergenfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/106,468

(22) Filed: Nov. 30, 2020

(65) Prior Publication Data

US 2021/0084610 A1    Mar. 18, 2021

Related U.S. Application Data

(63) Continuation of application No. 16/557,044, filed on Aug. 30, 2019, now Pat. No. 10,893,501.

(51) Int. Cl.
*H04W 64/00* (2009.01)
*H04W 52/02* (2009.01)

(52) U.S. Cl.
CPC ..... *H04W 64/003* (2013.01); *H04W 52/0216* (2013.01); *H04W 52/0235* (2013.01)

(58) Field of Classification Search
CPC ........... H04W 64/003; H04W 52/0235; H04W 52/0216; H04W 4/029; H04W 4/20; H04W 4/90; H04L 67/04; Y02D 30/70
See application file for complete search history.

(56) References Cited

U.S. PATENT DOCUMENTS

| 7,302,271 B2 | 11/2007 | Kalhan et al. |
| 2006/0068704 A1 | 3/2006 | Bhakta |
| 2012/0015657 A1 | 1/2012 | Comsa |

(Continued)

OTHER PUBLICATIONS

U.S. Office Action dated Apr. 10, 2020 in U.S. Appl. No. 16/557,044.

(Continued)

*Primary Examiner* — Joseph E Dean, Jr.
(74) *Attorney, Agent, or Firm* — Hartman & Citrin LLC

(57) ABSTRACT

Concepts and technologies directed to a location management service that facilitates power allocation at a wireless network coverage edge are disclosed. Embodiments can include a system that comprises a processor and a memory that stores computer-executable instructions that configure a processor to perform operations. The operations can include generating a power allocation command directed to a user equipment, where the power allocation command can instruct the user equipment to report a location of the user equipment in response to a trigger event associated with the user equipment. The operations can include providing the power allocation command to the user equipment. The operations can include receiving a reported location of the user equipment, where the reported location can indicate the location of the user equipment at a corresponding time relative to occurrence of the trigger event.

18 Claims, 11 Drawing Sheets

(56) References Cited

U.S. PATENT DOCUMENTS

2016/0066217 A1    3/2016  Krishnamoorthy
2016/0353379 A1*  12/2016  Vrzic ................ H04W 52/0235
2020/0396787 A1*  12/2020  Brugman ................ H04W 4/40

OTHER PUBLICATIONS

U.S. Notice of Allowance dated Oct. 8, 2020 in U.S. Appl. No. 16/557,044.

* cited by examiner

POWER ALLOCATION AT WIRELESS NETWORK COVERAGE EDGE

CROSS-REFERENCE TO RELATED APPLICATIONS

This application is a continuation of and claims priority to U.S. patent application Ser. No. 16/557,044, entitled "Power Allocation at Wireless Network Coverage Edge," filed Aug. 30, 2019, now U.S. Pat. No. 10,893,501, which is incorporated herein by reference in its entirety.

BACKGROUND

Historically, communication devices were limited to wired connections in order to facilitate communicative operations. With the rise of communication infrastructure, customers have access to various user equipment that can support wireless communication. In some instances, a wireless service provider may be associated with various instances of wireless networks using one or more communication protocols and/or industry standards. The one or more wireless networks may, alone and/or collectively, provide a wireless coverage area that facilitates wireless communicative coupling with a user equipment. Although customers may bring their user equipment to various geographic locations, the wireless network coverage may not necessarily support wireless communication in all areas at all times. One or more mobile communication service providers may provide communication infrastructure that facilitates wireless communication, and/or otherwise makes wireless communication available, within one or more locations within a wireless network coverage area. In some instances, user equipment may not be in a location that provides wireless communication service. Despite the lack of coverage, instances of user equipment may attempt to establish a wireless communication link with the out-of-range wireless network infrastructure, which in turn can consume hardware resources on the user equipment.

SUMMARY

The present disclosure is directed to a location management service, according to various embodiments. According to one aspect of the concepts and technologies disclosed herein, a system is disclosed. In some embodiments, the system can include or otherwise be provided by one or more instances of a network device, such as a server computer or other computing system of a network. The system can be communicatively coupled to a network, a radio access network, data stores, user equipment, and/or the like. In some embodiments, the system can include a processor and a memory. The memory can store computer-executable instructions that, in response to execution by the processor, cause the processor to perform operations. In embodiments, the operations can include generating a power allocation command directed to a user equipment, where the power allocation command can instruct the user equipment to report a location of the user equipment in response to a trigger event associated with the user equipment. In some embodiments, the trigger event can correspond to at least one of an invocation of a shut-down routine on the user equipment, the user equipment approaching a communication coverage edge, or the user equipment indicating a power level that is below a power threshold. In some embodiments, the operations can also include providing the power allocation command to the user equipment. In some embodiments, the power allocation command can instruct the user equipment to suspend execution of a shut-down routine for powering off the user equipment until after the user equipment attempts to report the location of the user equipment. In some embodiments, the operations can also include receiving a reported location of the user equipment, where the reported location can indicate the location of the user equipment at a corresponding time relative to occurrence of the trigger event.

In some embodiments, the operations can also include detecting that the user equipment is approaching a communication coverage edge of a wireless communication coverage area corresponding to a wireless communication service. In some embodiments, the operations can also include generating a lost connection time estimate for the user equipment, where the lost connection time estimate can provide an estimated amount of time before the user equipment loses contact with the wireless communication service, such as by moving past the communication coverage edge.

In some embodiments, the operations can also include generating a device trail map that presents reported locations of the user equipment since the trigger event occurred. In some embodiments, the device trail map is finalized—and thus available for presentation—in response to the reported location not being received at an expected reporting frequency. In some embodiments, the device trail map can include reported locations that begin at a time corresponding to the occurrence of the trigger event and end at a final connection location prior to the communication coverage edge. In some embodiments, the user equipment may discontinue reporting the location due to the user equipment no longer receiving the wireless communication service. In some embodiments, another device trail map can be generated at the first occurrence of a trigger event. In some embodiments, an instance of the device trail map can include one or more reported locations that were previously provided prior to the occurrence of the trigger event.

In some embodiments, the operations can also include detecting that the user equipment is no longer receiving wireless communication service. In some embodiments, the operations can also include generating a designated contact communication that informs a target device that the user equipment is no longer receiving wireless communication service. In some embodiments, the target device can be designated by the user equipment to receive the designated contact communication after the user equipment is no longer receiving wireless communication service. In some embodiments, the designated contact communication can authorize the target device to access a device trail map of the user equipment. In some embodiments, the operations can also include generating an access point configuration message that can instruct a network access point to temporarily withhold providing queued messages to the user equipment until the location of the user equipment is reported. In some embodiments, the queued messages can include at least one of a text message, an electronic mail message, a notification, or a call.

According to another aspect of the concepts and technologies disclosed herein, a method is disclosed according to an embodiment. In various embodiments, the method can include generating, at a network device executing a processor, a power allocation command directed to a user equipment, where the power allocation command can instruct the user equipment to report a location of the user equipment in response to a trigger event associated with the user equipment. In some embodiments, the trigger event can correspond to at least one of an invocation of a shut-down routine on the user equipment, the user equipment approaching a communication coverage edge, or the user equipment indicating a power level that is below a power threshold. In some embodiments, the method can also include providing the power allocation command to the user equipment. In some embodiments, the power allocation command can instruct the user equipment to suspend execution of a shut-down routine for powering off the user equipment until after the user equipment attempts to report the location of the user equipment. In some embodiments, the method can also include receiving a reported location of the user equipment, where the reported location can indicate the location of the user equipment at a corresponding time relative to occurrence of the trigger event.

In some embodiments, the method can also include detecting that the user equipment is approaching a communication coverage edge of a wireless communication coverage area corresponding to a wireless communication service. In some embodiments, the operations can also include generating a lost connection time estimate for the user equipment, where the lost connection time estimate can provide an estimated amount of time before the user equipment loses contact with the wireless communication service, such as by moving past the communication coverage edge.

In some embodiments, the method can also include generating a device trail map that presents reported locations of the user equipment since the trigger event occurred. In some embodiments, the device trail map is finalized—and thus available for presentation—in response to the reported location not being received at an expected reporting frequency. In some embodiments, the device trail map can include reported locations that begin at a time corresponding to the occurrence of the trigger event and end at a final connection location prior to the communication coverage edge. In some embodiments, the user equipment may discontinue reporting the location due to the user equipment no longer receiving the wireless communication service. In some embodiments, another device trail map can be generated at the first occurrence of a trigger event. In some embodiments, an instance of the device trail map can include one or more reported locations that were previously provided prior to the occurrence of the trigger event.

In some embodiments, the method can also include detecting that the user equipment is no longer receiving wireless communication service. In some embodiments, the operations can also include generating a designated contact communication that informs a target device that the user equipment is no longer receiving wireless communication service. In some embodiments, the target device can be designated by the user equipment to receive the designated contact communication after the user equipment is no longer receiving wireless communication service. In some embodiments, the designated contact communication can authorize the target device to access a device trail map of the user equipment. In some embodiments, the method can also include generating an access point configuration message that can instruct a network access point to temporarily withhold providing queued messages to the user equipment until the location of the user equipment is reported. In some embodiments, the queued messages can include at least one of a text message, an electronic mail message, a notification, or a call.

According to another aspect of the concepts and technologies disclosed herein, a computer storage medium is disclosed according to an embodiment. The computer storage medium can have computer-executable instructions stored thereon that, in response to execution by a processor of a system, cause the processor to perform operations. In some embodiments, the operations can include generating a power allocation command directed to a user equipment, where the power allocation command can instruct the user equipment to report a location of the user equipment in response to a trigger event associated with the user equipment. In some embodiments, the trigger event can correspond to at least one of an invocation of a shut-down routine on the user equipment, the user equipment approaching a communication coverage edge, or the user equipment indicating a power level that is below a power threshold. In some embodiments, the operations can also include providing the power allocation command to the user equipment. In some embodiments, the power allocation command can instruct the user equipment to suspend execution of a shut-down routine for powering off the user equipment until after the user equipment attempts to report the location of the user equipment. In some embodiments, the operations can also include receiving a reported location of the user equipment, where the reported location can indicate the location of the user equipment at a corresponding time relative to occurrence of the trigger event.

In some embodiments, the operations can also include detecting that the user equipment is approaching a communication coverage edge of a wireless communication coverage area corresponding to a wireless communication service. In some embodiments, the operations can also include generating a lost connection time estimate for the user equipment, where the lost connection time estimate can provide an estimated amount of time before the user equipment loses contact with the wireless communication service, such as by moving past the communication coverage edge.

In some embodiments, the operations can also include generating a device trail map that presents reported locations of the user equipment since the trigger event occurred. In some embodiments, the device trail map is finalized—and thus available for presentation—in response to the reported location not being received at an expected reporting frequency. In some embodiments, the device trail map can include reported locations that begin at a time corresponding to the occurrence of the trigger event and end at a final connection location prior to the communication coverage edge. In some embodiments, the user equipment may discontinue reporting the location due to the user equipment no longer receiving the wireless communication service. In some embodiments, another device trail map can be generated at the first occurrence of a trigger event. In some embodiments, an instance of the device trail map can include one or more reported locations that were previously provided prior to the occurrence of the trigger event.

In some embodiments, the operations can also include detecting that the user equipment is no longer receiving wireless communication service. In some embodiments, the operations can also include generating a designated contact communication that informs a target device that the user equipment is no longer receiving wireless communication service. In some embodiments, the target device can be designated by the user equipment to receive the designated contact communication after the user equipment is no longer receiving wireless communication service. In some embodiments, the designated contact communication can authorize the target device to access a device trail map of the user equipment. In some embodiments, the operations can also include generating an access point configuration message that can instruct a network access point to temporarily withhold providing queued messages to the user equipment until the location of the user equipment is reported. In some embodiments, the queued messages can include at least one of a text message, an electronic mail message, a notification, or a call.

It should be appreciated that the above-described subject matter may be implemented as a computer-controlled apparatus, a computer process, a computing system, a method, or as an article of manufacture such as a computer storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
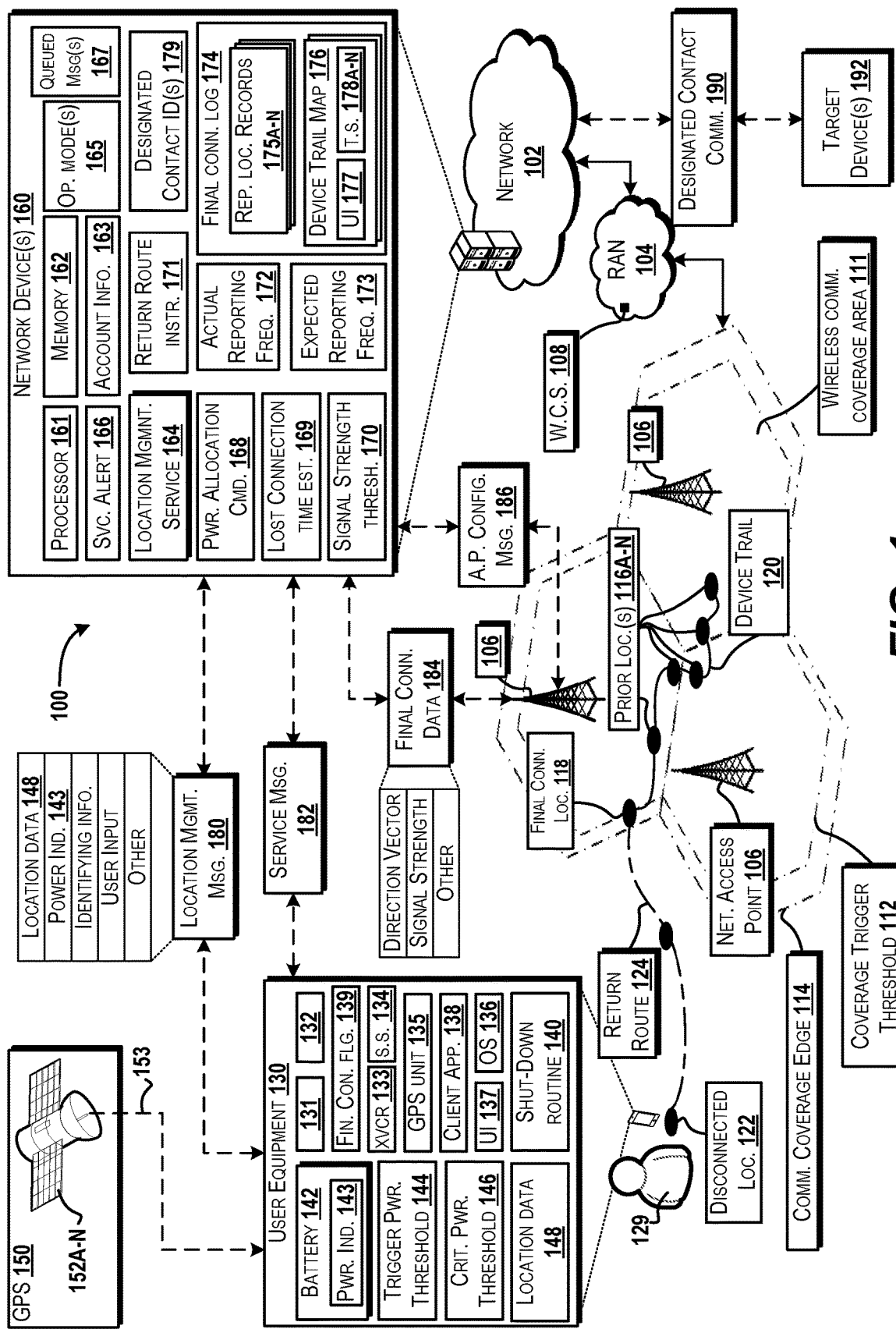
FIG. 1 is a block diagram illustrating an example operating environment for implementing a location management service for power allocation at a wireless network coverage edge, according to an illustrative embodiment.

The following detailed description is directed to a location management service that facilitates power allocation, location recordation, and emergency last call services at a wireless network coverage edge, according to various embodiments. In some instances, the user equipment may present an indistinct indication of wireless communication service availability, such as via a user interface presenting "bars" that are supposed to indicate signal strength. However, a user and/or an instance of user equipment may not be aware of the "wireless network coverage edges" of wireless network coverage, that is the boundaries corresponding to a wireless communication service provided by a communication service provider. In turn, a user and/or user equipment may not realize that the user equipment is approaching and/or has passed a wireless network coverage edge. In some instances, a wireless coverage area may not necessarily be uniform in size, shape, and/or coverage. For example, in some instances, the terrain of a certain geographic area (e.g., mountains, valleys, canyons, etc.) and/or other objects (e.g., collection of skyscrapers, a tunnel, a bridge, etc.) may be such that a "dead zone location" exists inside and/or outside the wireless coverage area of the wireless network that provides a wireless communication service. A dead zone location refers to a particular location where a user equipment does not receive wireless network reception and cannot engage in a wireless communication service with a network and/or other device. Therefore, a dead zone location is not necessarily contingent on the distance a user equipment is located relative to the network access point (and/or other network device) that facilitates and supports the wireless coverage area for wireless communication service. In some instances, a dead zone location may be referred to as an out-of-service location.

By way of example, in some instances, a hiker may walk along a trail in the mountains to a location that is not serviced by a radio access network of a mobile communication service provider, and therefore the hiker may be located in a dead zone location because the user equipment of the hiker is outside of the range of wireless communicative coupling with a network access point. In another example, a businessperson may use a user equipment and be walking past a network access point in a large metropolitan area (e.g., walking along a sidewalk next to a building that hosts a cell tower). While walking above ground, the user equipment of the businessperson may indicate full wireless service coverage. However, when the businessperson enters an underground train station, the person's user equipment may lose wireless communication service while the person is on the train platform and/or while riding the train, and thus the person would be located in a dead zone location. As such, the user equipment of the businessperson may be located in a dead zone location, and thus outside of the wireless coverage area of wireless communication service, despite the businessperson being relatively closer to the network access point than the hiker who is located much further away (e.g., the businessperson being at a dead zone located less than 1 mile from the network access point, while the hiker may be at a dead zone located 30 miles from the network access point).

In some instances, once the user equipment returns to a location that is within the wireless coverage area, the user equipment may be bombarded with missed calls, texts, notifications, voicemail messages, emails, and/or any other type of queued message that is scheduled to be delivered by the network to the user equipment. The delivery of queued messages may further consume and drain resources on the user equipment, which may have limited power, processing, and/or memory resources available at the time of reentry to wireless communication service. In emergency situations, the user equipment may not have enough available resources to contact a designated party due to the queued messages being delivered and consuming the remaining resources on the user equipment. Traditional attempts to mitigate the occurrence of dead zone locations may include increasing the amount in infrastructure and access points. However, the addition of network access points raises technical and operating challenges, including but not limited to, increased operating costs, increased network energy usage, and/or increased network latency through an increased number of network nodes through which a message may travel.

As such, concepts and technologies of the present disclosure provides a location management service that facilitates and supports power allocation, location recordation, and communication services for user equipment at various locations relative to a wireless network coverage edge. A user can subscribe to the location management service and may configure one or more operations, functions, and/or settings via a user interface presented by a user equipment. In some instances, the user can select from among various modes and/or options, such as but not limited to, a bread crumb mode, a coverage edge mode, a critical power mode, and/or another mode (e.g., a customized mode) that facilitates one or more operations discussed herein. In some embodiments, when a mode is activated and/or a user equipment is authenticated with the location management service, the user equipment may begin reporting the current location of the user equipment. In some instances, the location data may be provided at (ir)regular intervals so as to enable generation of a device location trail, which may be used to trace the path of the user equipment and the corresponding user in the event of an emergency. In some instances, location data may be provided by the user equipment when the user equipment is about to run out of power, when the user manually powers down the user equipment, when the user equipment is powered on, and/or in response to another event or trigger (e.g., crossing a threshold power level).

In some embodiments, the location management service can identify other users that should serve as designated contacts who should be contacted in response to one or more triggers and/or operations discussed herein. The designated contacts may be authorized to access and/or receive data and/or information pertaining to the user equipment as supported by the location management service. Various trigger events may prompt one or more operations discussed herein, such as but not limited to the user providing an emergency notification, powering down of the user equipment, the user equipment running low on power, the user equipment approaching a wireless coverage edge, the user equipment no longer being within a wireless coverage area, another trigger defined by the user, a network event (e.g., wireless service outage in a particular geographic area), another trigger, or the like. In some embodiments, the location management service can instruct the user equipment to prioritize execution of operations that facilitate transmission of the location of the user equipment, such as suspending tasks, routines, and/or threads of applications and/or operating systems on the user equipment that may attempt to execute to begin shutting down the user equipment (and/or any other task), and prioritize performing operations that generate location data and transmit the location of the user equipment. For example, the user equipment may be instructed to allocate remaining power to the transmission of location data before leaving, and/or upon return to, the wireless communication coverage area so as to report the location of the user equipment using any remaining power, and in turn enable a designated contact to be informed of one or more reported locations of the user equipment prior to power loss and/or lack of reception.

In some embodiments, the user equipment may be informed by the location management service that the user is approaching a communication coverage edge and/or an estimated time until connection to the wireless communication service is lost. In some embodiments, the user equipment may be provided with instructions that enable the user equipment (whether inside and/or outside the wireless network coverage area) to determine how fast and/or how far the user equipment has traveled from the last known signal location (i.e., the previous and/or final connection location within the wireless coverage area). The location management service can provide, and/or the user equipment can generate, return route data that provides a virtual return route so as to be presented to the user and can inform the user that the user equipment does and/or does not have enough remaining power to return to the last known location with wireless service coverage if the user equipment retraces a path and/or follows the return route provided by the return route data. In some embodiments, the user equipment may not have enough power to continue operation prior to the return to a previous connection location (i.e., the location where the user equipment was previously able to receive the wireless communication service). As such, in some embodiments, the user equipment can be configured to shut down prior to returning to the wireless communication coverage area so as to preserve any power remaining in the battery. In some embodiments, upon returning to the wireless communication coverage area, the user equipment can transmit a message, data, and/or information indicating a final connection location prior to loss of power, and the network access point may withhold sending queued messages to the user equipment until the final connection location has been reported. The user may have the option to set an alert when the user equipment is approaching, crossing, and/or exiting a communication coverage edge of the wireless network service, which may or may not trigger the user equipment and/or a network device to perform one or more operations discussed herein. In some embodiments, the location management service may set, define, and/or instantiate one or more thresholds by which to trigger performance of operations and/or presentation of data, such as but not limited to one or more power thresholds, signal strength thresholds, and/or another threshold. For example, the location management service may provide one or more power thresholds such that the power level on the user equipment can be detected and obtained by the location management service, and in turn the one or more operations performed, such as the user equipment providing location data, a message being sent to a designated contact, and/or another operation. In some instances, the settings and/or thresholds can be customized by the user and/or can be defined and/or initiated by the location management service operating in the network. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor so as to transform the processor into a particular machine. Moreover, those skilled in the art will appreciate that the subject matter described herein may be practiced with other computer system configurations, including hand-held devices, vehicle computer systems, network access nodes, network servers, multiprocessor systems, microprocessor-based or programmable consumer electronics, minicomputers, mainframe computers, and other particularized, non-generic machines.

Referring now to FIG. 1, aspects of an operating environment 100 for implementing various embodiments of the concepts and technologies disclosed herein for location management service will be disclosed, according to an illustrative embodiment. It should be understood that the operating environment 100 and the various components thereof have been illustrated for clarity purposes to simplify the manner of discussion. Accordingly, additional and/or alternate components can be made available or otherwise implemented within the operating environment 100 without departing from the embodiments described herein. As such, the manner of discussion is provided such that one of ordinary skill in the technology can implement one or more embodiments described herein.

The operating environment 100 shown in FIG. 1 can include a communications network ("network") 102, one or more instances of a radio access network ("RAN") 104, a network access point 106, a user 129, a user equipment ("UE") 130, a global positioning system ("GPS") 150, a network device 160, and/or a target device 192. The number of instances of any particular element shown in FIG. 1 is for illustration purposes only and should not be construed as limiting in any way. Therefore, it is understood that zero, one, two, or more instances of each of the components shown in FIG. 1 may be provided in various embodiments.

The network 102 can include almost any type of computer networks as well as communications networks. The network 102 can be hosted, in part or in whole, by network devices and/or computer systems that may be associated with a communications service provider. In some embodiments, the communication service provider can operate a radio access network, such as the RAN 104. In some embodiments, the RAN 104 may operate within and/or separate from the network 102. In some embodiments, the network 102 can include one or more of a radio access network (e.g., the RAN 104), a core network, an IP-based network, a transport network, an optical transport network, a circuit switched network, a mobile Wide Area Network, a combination thereof, another type of network, or the like. In some embodiments, the network 102 can include and support one or more of an evolved universal mobile telecommunications system ("UMTS"), a terrestrial radio access ("E-UTRAN"), a serving/PDN gateway ("S/PGW"), a home subscriber server ("HSS"), an access and mobility function ("AMF"), a session management function-user plane function ("SMF-UPF"), unified data management ("UDM"), an application server, an application function ("AF"), an enhanced mobile broadband system ("eMBBS"), a mobile edge computing ("MEC") unit, a combination thereof, and/or any other systems, devices, and/or functions that may be included in 2G, 3G, 4G, 5G, or later network communication architecture and infrastructure. The network 102 can host, be in communication with, and/or provide access to one or more network nodes and/or computer systems (e.g., the network device 160) that can host one or more instances of virtualized and/or non-virtualized network services.

The RAN 104 can operate in communication with and/or as a part of the network 102, although this may not necessarily the be the case. In some embodiments, the RAN 104 may be associated with a wireless communication service provider, where the RAN 104 can support, host, facilitate, and/or provide, at least in part, a communication service, such as a wireless communication service 108. For clarity purposes, the wireless communication service 108 will be discussed in a configuration that provides wireless communicative coupling via one or more radio communication paths, according to an embodiment. As such, the wireless communication service 108 can be associated with a mobile network operator that enables customers to subscribe and/or pay for the use of the wireless communication service 108, which can be engaged in via communicative coupling between a wireless communication device (e.g., the UE 130) and one or more instances of the network access point 106 of the RAN 104. It should be understood that the examples provided are for illustration purposes only, and therefore should not be construed as limiting in any way.

In some embodiments, the wireless communication service provider and/or the wireless communication service 108 may be associated with, and/or otherwise provide, one or more network services, such as but not limited to, communication services (wired and/or wireless), compute services, data storage and retrieval services, routing services, switching services, relay services, a software-as-a-service, streaming content services, location and mapping services, and/or other virtualized or non-virtualized network service. It should be understood that, as used herein, the term "service" should be construed as one or more computer executable instructions and/or computer readable instructions that can provide a set of communications and/or perform network functions and/or perform operations on behalf of a computer system (e.g., corresponding to the network device 160), the RAN 104, and/or the network 102. As such, use of the term "service" does not include, and shall not be construed or interpreted to include or be directed to, any abstract idea, judicial exception, and/or non-patent eligible subject matter. Therefore, in the claims, any use of the term "service" and variations thereof is not directed to, does not include, and shall not be interpreted to cover non-patent eligible subject matter. It should be understood that the examples provided are for illustration purposes only, and therefore should not be construed as limiting in any way.

In various embodiments, the network 102 and/or the RAN 104 can provide communicative coupling for and/or otherwise communicate with various network devices, computer systems, and user equipment, such as but not limited to, the UE 130, one or more instances of the network access point 106, the network device 160, and/or the target device 192. In various embodiments, one or more instances of the network access point 106 can operate in communication with and/or as a part of the RAN 104. Instances of the network access point 106 can provide, support, and/or otherwise facilitate the functionality and operation of the wireless communication service 108. The wireless communication service 108 can support, maintain, or otherwise facilitate wireless communicative coupling, such as via wireless communication paths that may be configured and/or conform to one or more industry standards, technical and/or professional protocols, or the like. An instance of the network access point 106 can include, but should not be limited to, at least one of a base transceiver station, a femtocell, a microcell, a picocell, an eNodeB, a NodeB, a gNode B (i.e., an access point that supports and/or incorporates use of New Radio access technology, standards, and/or protocols, such as provided by 5G or later technology), a multi-standard metro cell node, and/or any other network nodes and/or combinations thereof that are capable of providing wireless communicative coupling to and/or from the RAN 104. It is understood that an instance of the network access point 106, the RAN 104, the network device 160, the network, and/or the wireless communication service 108, can be configured to support or otherwise conform to one or more current and/or future communication standards and/or protocols, such as but not limited to 2G, 3G, 4G, LTE, LTE+, LTE-U, 5G, New Radio standards, other future standards, or the like, such as understood by one of ordinary skill in the technology. It should be understood that the examples provided are for illustration purposes only, and therefore should not be construed as limiting in any way.

In various embodiments, instances of the network access point 106 can provide wireless network coverage to support wireless communicative coupling for the wireless communication service 108, where the wireless communicative coupling is provided by one or more wireless communication paths with various devices, such as instances of the UE 130 and/or the target device 192. One or more instance of the network access point 106 can provide and support the wireless communication service 108 over a geographic area based on the particular configuration and/or capabilities of the radio component infrastructure. The geographic area and/or collective locations in which the wireless communication service 108 can be received by a wireless communication device (e.g., the UE 130) is referred to as a wireless communication coverage area ("WCCA") 111. In some embodiments, the WCCA 111 may be referred to as a wireless coverage area, a wireless network coverage area, a cell area, a service area, a combination thereof, or the like. In various embodiments, any location where a wireless communication device (e.g., instances of the UE 130) can receive, engage, and/or otherwise communicate with the wireless communication service 108 via a wireless communication path (as opposed to remote log-in from a device using a connection not provided by the wireless communication service 108) can be considered a location within the WCCA 111. Each instance of the network access point 106 may provide a coverage area to support access to the wireless communication service 108. Therefore, the aggregation of the coverage area for each instance of the network access point 106 may be considered the total coverage area of the WCCA 111 provided by the wireless communication service 108. As illustrated in FIG. 1, the WCCA 111 is shown as a continuous and contiguous geographic area, but this may not necessarily be the case for every embodiment. In some embodiments, the WCCA 111 can be contiguous and/or discontiguous. In various embodiments, the WCCA 111 can be uniform and/or non-uniform with respect to shape, range of service, and/or ability to support the wireless communication service 108. In various embodiments, any subset and/or portion of the total coverage area corresponding to the wireless communication service 108 may be considered to be the WCCA 111. It should be understood that the examples provided are for illustration purposes only, and therefore should not be construed as limiting in any way.

In various embodiments, the WCCA 111 can have, and an instance of the network access point 106 can provide, a wireless communication coverage edge ("communication coverage edge"), such as a communication coverage edge 114. In some embodiments, the communication coverage edge 114 may be referred to as a wireless network coverage edge. The communication coverage edge 114 refers to a location where the wireless communication service 108 can still be received by the UE 130, but serves as a final position for being within communicative coupling range of the network access point 106 for the wireless communication service 108. Therefore, the communication coverage edge 114 can provide a communicative demarcation between being in-range of the wireless communication service 108 (i.e., within the WCCA 111) and being out-of-range of the wireless communication service 108 (i.e., at a location that does not correspond to the WCCA 111 and therefore does not allow for wireless communication to the WCCA 111). The communication coverage edge 114 may surround and/or be at a measurable distance from an instance of the network access point 106 that supports the wireless communication service 108, though this is not necessarily the case. An instance of the communication coverage edge 114 may, but not necessarily, be located at a uniform distance from an instance of the network access point 106.

In some embodiments, a location that is at a defined distance prior to and/or before the communication coverage edge 114, where the wireless communication service 108 can be received and accessed, may be assigned and/or otherwise designated as a coverage trigger threshold 112. For example, if a user travels from the network access point 106 towards an instance of the communication coverage edge 114, then at a defined distance before reaching the communication coverage edge 114, the user may travel past a location corresponding to the coverage trigger threshold 112. The coverage trigger threshold 112 can operate as a trigger event that causes one or more operations to be performed, such as any operations discussed below with respect to FIGS. 3A, 3B, 4A, and/or 4B. In some embodiments, the coverage trigger threshold 112 can correspond to location indicators (e.g., latitude, longitude, altitude, street addresses, road markers, waypoints, etc.) that can be defined, configured, and/or otherwise set. For example, as the user 129 approaches the communication coverage edge 114 with the UE 130, the UE 130 may be configured (and/or receive instructions) to perform one or more operations discussed herein, such as but not limited to, presenting an alert that the UE 130 is approaching the communication coverage edge 114, and/or any other operations discussed herein. In some embodiments, the coverage trigger threshold 112 may be defined according to particular geographic coordinates that can be stored and/or accessed by a computer system, such as the network device 160. In some embodiments, the location of a communication device (e.g., the UE 130) may be detected independent of the communication device (e.g., by an instance of the network access point 106). When the UE 130 crosses the trigger location corresponding to the coverage trigger threshold 112, one or more network operations may be performed.

In some embodiments, the coverage trigger threshold 112 may correspond to, and/or be defined as, a signal strength threshold 170. The signal strength threshold 170 refers to a defined signal strength amount (e.g., measured in decibels) on the UE 130 that can trigger the UE 130 to present a user interface, an alert, report the location of the UE 130, and/or perform other operations, and/or trigger the network device 160 to perform operations and/or generate instructions for the UE 130 to perform. As such, in some embodiments, the signal strength threshold 170 can correspond to a trigger event. Specifically, when a signal strength of the UE 130 falls below the signal strength threshold 170, then one or more operations may be performed, such as reporting of the location of the UE 130. In an embodiment, when the UE 130 passes the coverage trigger threshold 112 and before the communication coverage edge 114 is crossed (i.e., in between the location for the coverage trigger threshold 112 and the edge location for communication coverage edge 114), a portion of the wireless communication service 108 may be unavailable (i.e., no longer available). For example, after moving past the coverage trigger threshold 112, the UE 130 may lose the ability to perform voice calls (incoming and/or outgoing), but incoming data messages to the UE 130 may still be available. Therefore, in some embodiments, the UE 130 may be able to receive a data portion of the wireless communication service 108 (i.e., incoming messages, data, instructions, alerts, and/or other information sent to the UE 130) while located between the coverage trigger threshold 112 and the communication coverage edge 114, but the UE 130 may not engage in another service feature of the wireless communication service 108 (e.g., not being able to send outgoing voice calls). In some embodiments, when the UE 130 is able to receive diminished service (i.e., not receive the full services offered by the wireless communication service 108, such as not being able to receive incoming and outgoing voice and data communications), the RAN 104, the network access point 106, and/or the network device 160 may engage a lower-power-wide-area-network ("LPWA") to communicate with the UE 130 prior to the UE 130 crossing the communication coverage edge 114 and losing all communicative coupling. For example, in an embodiment, the UE 130 may be limited to receiving and/or transmitting data communications (e.g., from the network access point 106 and/or the network device 160), but not voice communications, using a particular LPWA protocol, such as a Narrow Band Internet of Things protocols and/or other protocols and/or configurations. By this, the UE 130 may be given instructions, alerts, and/or other information so as to warn the UE 130 of the upcoming communication boundary of the communication coverage edge 114. It should be understood that the examples provided are for illustration purposes only, and therefore should not be construed as limiting in any way.

In various embodiments, in response to the UE 130 crossing the communication coverage edge 114, the UE 130 may enter and/or otherwise be located at a place where the wireless communications service 108 cannot be received, which can be referred to as a disconnected location 122. An instance of the disconnected location 122 refers to any location where the wireless communications service 108 cannot be received by the UE 130. Therefore, the UE 130 cannot engage in wireless communicative coupling with an instance of the network access point 106 when the UE 130 is at the disconnected location 122. As such, the UE 130 may lose connection to the network access point 106, the RAN 104, the network 102, and/or another device when the UE 130 moves outside of the WCCA 111. In some embodiments, the disconnected location 122 may be referred to as a "no service" location, a "dead zone" location, an "out-of-range" location, or any other indication that the wireless communication service 108 cannot be received at a particular location. In some embodiments, instances of the disconnected location 122 can correspond to particular geographic coordinates and/or a range of geographic coordinates and/or other location identifiers. In an embodiment, the WCCA 111 may incorporate all coverage areas provided by, associated with, and/or correspond to all communication technology standards and/or protocols offered and/or available to the RAN 104, and therefore being located at the disconnected location 122 can mean that the wireless communication service 108 cannot be reached using the wireless communication service 108, irrespective of the particular wireless communication technology being implemented to provide a wireless communication path with the UE 130.

In some embodiments, an instance of the disconnected location 122 may have a temporal aspect (i.e., be transient and/or intransient) based on the reason for the lack of coverage and/or connection to the wireless network service (e.g., the wireless communication service 108). For example, in some embodiments, an instance of the disconnected location 122 may correspond to a location in a mountain range where a communication link with the network access point 106 cannot be established (e.g., due to lack of signal reception), and as such, that instances of the disconnected location 122 may be considered to be intransient because the lack of wireless service coverage may not necessarily be restored and/or created based solely on the elapse of time. Another example of an intransient or otherwise non-temporal instance of the disconnected location 122 may include a location within a building, a location underground, a location adjacent to an object, and/or any other location where wireless communication with the network access point 106 is obstructed and may not necessarily be remedied but for a change in network and/or service configuration and/or a change in the object that is obstructing connection to the UE 130. In some embodiments, an instance of the disconnected location 122 may exist at a location due to a man-made and/or non-man-made occurrence, event, structure, or the like, and thus may or may not correspond to a location that previously received reception and/or otherwise may have previously been identified as being within the WCCA 111. Therefore, in some embodiments, there may exist an instance of the disconnected location 122 between two or more instances of the network access point 106. It is understood that various instances of the UE 130 may be located at, and/or passing through, different instances of the disconnected location 122 for varying amounts of time. As such, in some instances, reference to the disconnected location 122 can include any instance of a location where the wireless communication service 108 cannot be reached and/or utilized by the UE 130. It should be understood that the examples provided are for illustration purposes only, and therefore should not be construed as limiting in any way.

In various embodiments, a location of the UE 130 may be detected and/or determined by the UE 130 and/or by one or more network devices associated with the wireless communication service 108 (e.g., one or more instances of the network access point 106, the network device 160, and/or any other device of the RAN 104 and/or the network 102). A particular location of the UE 130 may be identified and/or otherwise indicated by an instance of location data, such as the location data 148. In various embodiments, an instance of the location data 148 can include a time stamp and a location identifier. The time stamp can indicate a time (e.g., date and/or time-of-day, such as hours, minutes, etc.) when the UE 130 was at the location indicated by the location identifier of the location data 148. The location identifier portion of the location data 148 can include any information and/or measurements that indicate a location of the UE 130 at a point in time corresponding to the time stamp. For example, location identifiers can include, but should not be limited to, one or more geocoordinates (e.g., latitude, longitude, altitude, etc.), a geographic address (e.g., street name, highway identifier, house number, etc.), and/or relative location to a known object (e.g., distance away from and/or headed from a known location of objects such as but not limited to, a building, mile marker, monument, mountain, network device, etc.). An instance of location data 148 may be generated each time the location of the UE 130 is determined and/or detected.

In some embodiments, the UE 130 can determine and/or detect a location of the UE 130 using a Global Positioning System ("GPS") unit, such as a GPS unit 135 that can be included in, and/or communicate with, the UE 130. In an embodiment, the operating environment 100 can include a GPS 150 that has a plurality of satellites, such as satellites 152A-N. Each of the satellites 152A-N can provide a GPS communication 153, which can be configured to be received by an instance of the GPS unit 135. Instances of the GPS communication 153 can include location information of one or more of the satellites 152A-N and any other information that facilitates location determination and/or detection as understood by one of ordinary skill in the technology. One of ordinary skill will understand how the GPS unit 135 can use one or more of the GPS communications 153 to determine, calculate, and/or otherwise identify a location of the UE 130 so as to generate an instance of the location data 148, and therefore further explanation is not warranted. In some embodiments, an instance of the location data 148 may be generated based on the UE 130 invoking the GPS unit 135 to obtain location measurements from the GPS communication 153 which can be used to populate the location data 148 and identify the location of the UE 130. In some embodiments, the UE 130 may use the GPS unit 135 to generate an instance of the location data 148 at a location that is within the WCCA 111 (i.e., at a location that can receive the wireless communication service 108) and/or outside of the WCCA 111 (e.g., at an instance of the disconnected location 122). Therefore, an instance of the location data 148 that is based on use of the GPS unit 135 may be generated irrespective of whether reception of the wireless communication service 108 is available.

For example, in an embodiment, the UE 130 may use the GPS unit 135 to generate an instance of the location data 148 based on information received from the satellites 152A-N. In some embodiments, an instance of the location data 148 may be generated irrespective of whether the UE 130 is able to communicate with the network access point 106 and/or the wireless communication service 108. As illustrated in FIG. 1, for example, in some embodiments, the UE 130 may be outside of the WCCA 111 at the disconnected location 122, and therefore may be unable to engage in and/or with the wireless communication service 108 because the UE 130 is beyond the communication range of the network access point 106. In this example, the UE 130 can activate the GPS unit 135 and determine the location of the UE 130 despite the lack of wireless communication service reception. Therefore, an instance of the location data 148 can be generated to identify the location of the UE 130 irrespective of whether the UE 130 is within the WCCA 111 or outside the WCCA 111.

In some embodiments, the location of the UE 130 can be determined and/or detected, and thus an instance of the location data 148 can be generated, based on invoking and/or implementing one or more location processes by interacting, referencing, observing, and/or communicating with another device and/or system, such as but not limited to, one or more instances of the GPS 150; one or more instances of the network access point; the RAN 104; the network 102, the network device 160; and/or any other device and/or computer system that can facilitate and/or support the location processes. Examples of location processes that can be executed, invoked, used, and/or otherwise implemented can include, but should not be limited to, trilateration, multilateration, the use of a mobile terminated location request (MT-LR), the use of a network induced location request (NI-LR), and/or the use of a mobile originated location request (MO-LR), such as understood by one of ordinary skill in the technology. As such, any location information determined, obtained, and/or detected by and/or from the UE 130 and/or via communication with another device (e.g., the network access point 106) may be used to generate an instance of the location data 148.

In various embodiments, the location that is reported by and/or about the UE 130 can correspond with a particular location that is inside the WCCA 111 or outside the WCCA 111. For example, if the UE 130 is at a location that is not covered by the wireless communication service 108, then the UE 130 may be considered to be located outside of the WCCA 111, and therefore the corresponding instance of the location data 148 can indicate and/or otherwise identify an instance of the disconnected location 122. In some embodiments, the UE 130 may report a location to the network device 160 (e.g., via an instance of the location data 148) while the UE 130 remains at the reported location corresponding to the location data 148, and/or after the UE 130 has moved away from the location being reported. For example, in an embodiment of FIG. 1, the UE 130 may be located at a final connection location 118, which corresponds to a location that is within the WCCA 111 (i.e., can receive the wireless communication service 108 and thus communicate with one or more of the network access points 106) and is the last (i.e., final) location that is reported by the UE 130 prior to the UE 130 losing communicative coupling and connection with the wireless communication service 108 (and/or any device associated thereof, such as the network access point 106, the network device 160, etc.). The UE 130 may have previously been located at a prior location, such as any of the prior locations 116A-N. An instance of a prior location (e.g., any of the prior locations 116A-N) refers to at any location within and/or outside of the WCCA 111 that the UE 130 was located and an instance of the location data 148 was generated. Stated differently, at a point in time prior to the final connection location 118, the UE 130 may have been located at one or more other locations at which an instance of the location data 148 was generated, and thus the corresponding instance of the prior location (e.g., any of the prior locations 116A-N) was recorded and/or reported.

The operating environment 100 can include one or more instances of the network device 160. In the embodiment illustrated in FIG. 1, the network device 160 can be configured as a network server. Instances of the network device 160 can include any computer system and/or device that supports and/or provides computing components that facilitate operation of one or more services discussed herein. The network device 160 may be configured the same as, or at least similar to, a computer system discussed below with respect to FIG. 6. In embodiments, the network device 160 can include a processor 161, a memory 162, communication components, and any other equipment that supports the functionality of one or more operations discussed herein. The processor 161 can be configured according to an instance of a processing unit discussed with respect to FIG. 6. The memory 162 can be configured according to a memory discussed with respect to FIG. 6. In various embodiments, the network device 160 can support and/or be associated with the wireless communication service 108. The network device 160 may be associated with a communications service provider and/or another entity that can provide one or more services discussed herein, such as the wireless communication service 108.

In various embodiments, a communication service provider can offer a location management service ("LMS"), such as the LMS 164. The LMS 164 can be supported, provided, and/or otherwise hosted by one or more network devices that can communicate with the wireless communication service, such as the network device 160. In some embodiments, the LMS 164 may be offered as an "add-on" communications service to an already existing communication service, such as an add-on to the wireless communication service 108. The LMS 164 can have access to various information, data stores, and/or networks so as to facilitate discovery, detection, and/or communication with one or more subscribers to the wireless communication service 108, such as the UE 130 associated with a user 129 who can enroll in a subscription to the wireless communication service 108. For example, in some embodiments, the LMS 164 can access an instance of an account information 163 that corresponds to a particular user and/or user's device, such as the user 129 and/or the UE 130. The account information 163 can include any information about the UE 130, the user 129, a user profile and/or a device profile associated with the wireless communication service 108, and/or the like. The account information 163 may be used to store identifiers of devices that subscribe, and thus are authorized, to use a service, such as the wireless communication service 108 and/or the LMS 164. In various embodiments, the LMS 164 can provide instructions to the UE 130 that facilitates power allocation and management so as to allow the UE 130 to report the final connection location 118 before power loss and/or loss of reception of the wireless communication service 108. In various embodiments, the LMS 164 can provide an initial configuration such that the UE 130 can perform one or more operations discussed herein without relying on an instruction from the network device 160 each time an operation is performed, although this may not necessarily be the case. In some embodiments, the LMS 164 may be activated and/or otherwise initiated based on the UE 130 reporting a trigger event associated with the UE 130, which will be discussed in further detail below.

In various embodiments, the operating environment 100 can include one or more instances of the UE 130. According to various embodiments, the functionality of the UE 130 may be provided by one or more mobile telephones, smartphones, laptop computers, tablet computers, set-top boxes, over-the-top devices, Internet of Things devices, connected vehicles (including any devices therein), remotely operated devices, server computers, desktop computers, gateway devices, other computing systems, and/or the like. It should be understood that the functionality of the UE 130 can be provided by a single device, by two or more similar devices, and/or by two or more dissimilar devices. For purposes of describing the concepts and technologies disclosed herein, the UE 130 is shown in FIG. 1 and discussed herein as a mobile telephone (e.g., a smartphone). It is understood that this may not necessarily be the case for all embodiments. Because this example is used to illustrate the concepts and technologies disclosed herein, it should be understood that this specific embodiment is illustrative, and therefore should not be construed as being limiting of the concepts and technologies disclosed herein in any way. Further discussion of aspects that can be included in one or more embodiments of the UE 130 is provided below with respect to FIG. 7.

In various embodiments, instances of the UE 130 can include a processor 131, a memory 132, a communications transceiver 133, an operating system ("OS") 136, and/or a GPS unit 135. The processor 131 can include a processing unit that executes and can be configured to perform one or more operations discussed herein. An instance of the processor 131 can include aspects of a processing unit as discussed below with respect to FIGS. 6 and/or 7. In some embodiments, an instance of the memory 132 can include a data storage device that provides data and/or information storage for the UE 130. Instances of memory (e.g., the memory 132) can be configured according to an embodiment of memory discussed below with respect to FIGS. 6 and/or 7. It is understood that, in the claims, use of the term "memory" and/or "computer storage medium" and variations thereof does not include, and shall not be construed to include, a wave or a signal per se and/or communication media.

The communications transceiver 133 can include a radio transceiver and circuitry that supports and facilitates wireless communicative coupling so as to engage and communicate with other devices and/or services, such as but not limited to the network access point 106 and/or the wireless communication service 108. It is understood that the communications transceiver 133 can include one or more wireless transmitters and/or one or more wireless receivers that can be and/or are configured to operate according to wireless standards, protocols, and/or technologies. In some embodiments, individual instances of communications transceiver 133 (and/or instances of wireless transmitters and/or receivers included therein) may be activated and/or deactivated while the UE 130 is powered on or otherwise operating. For illustration purposes, the communications transceiver 133 shown in the operating environment 100 is shown and described as providing at least cellular communication paths for wireless communicative coupling, though the communications transceiver 133 may not necessarily be limited to only this embodiment. In some embodiments, the UE 130 can include a first transceiver (e.g., a first instance of the communications transceiver 133) that is configured to operate on (and/or otherwise facilitate and/or support communication using) a cellular radio technology standard (e.g., a cellular network protocol, such as but not limited to, 2G, 3G, 4G, LTE, 5G, etc.) and a second transceiver (e.g., a second instance of the communications transceiver 133) that is configured to operate on (and/or otherwise facilitate and/or support communication using) a Low Power Wide Area Network radio technology standard (e.g., Narrowband Internet of Things ("NB-IoT"), LTE-Machine Type communication ("LTE-M"), one or more New Radio standards, and/or the like). It is understood that one or more radio communication technologies may be supported by the communications transceiver 133.

In various embodiments, the communications transceiver 133 can determine, indicate, and/or present a signal strength 134. The signal strength 134 can refer to an indication of the received power output from one or more instances of the network access point 106 as received by the UE 130 at a particular location relative to the transmitting network node (e.g., one or more of the network access point 106). In some embodiments, the signal strength 134 detected by the UE 130 can be measured in decibels and/or decibel-millivolts per meter. In some embodiments, the signal strength 134 may be indicated and/or presented via a user interface of the UE 130, such as a user interface 137. In some embodiments, the signal strength 134 can be presented in a simplified and/or non-technical graphic (i.e., without presenting measurements in decibels), such as by presenting parallel graphical bars with varied height, where the greater number of bars and/or increased height of the bars indicate increased amounts of signal strength 134, so as to provide an indication of the level of reception and/or ability to receive the wireless communication service 108. In some embodiments, the signal strength 134 can be reported or otherwise provided to the network device 160 and/or any service (e.g., the wireless communication service 108 and/or the LMS 164). In some embodiments, the LMS 164 can obtain, retrieve, define, and/or analyze a signal strength threshold 170 from an accessible memory, such as the memory 162. In some embodiments, the signal strength threshold 170 can serve as a benchmark to compare against instances of the signal strength 134 received from the UE 130. For example, in an embodiment, the signal strength threshold 170 can be defined as in terms of a measured signal strength (i.e., in units of decibels and/or another unit) and/or in terms of a presented signal strength (i.e., by an indicator that is graphically presented on the user interface 137) such as the number of bars present within a range of possible bars (e.g., one signal bar presented out of a possible maximum of five signal bars). As such, the signal strength threshold 170 can define the amount of signal strength (indicating the ability to receive the wireless communication service 108) such that if the signal strength 134 falls below the signal strength threshold 170, then one or more operation may be performed. In some embodiments, the signal strength 134 being less than the signal strength threshold 170 may itself serve or otherwise correspond to a trigger event that can trigger one or more operations to be performed, although this may not necessarily the be the case. In some embodiments, the LMS 164 can determine that despite the signal strength 134 being less than the signal strength threshold 170, the UE 130 may not necessarily the located near and/or be approaching an instance of the communication coverage edge 114, and therefore one or more operations (e.g., contacting a third party, recording the reported location, generating a device trail map, and/or another operation discussed herein) may not performed and/or may be temporarily suspended until the UE 130 is also approaching the communication coverage edge 114 and/or is going to run out of power. It is understood that the examples provided are for illustration purposes only, and therefore should not be construed as limiting in any way.

In various embodiments, the UE 130 can execute one or more instances of the OS 136 and one or more application programs such as, for example, a client application 138. The OS 136 can be configured to operate and/or include aspects of various embodiments that are discussed below in further detail with respect to FIGS. 6 and/or 7. In some embodiments, an instance of the client application 138 can include, but should not be limited to, mobile applications, plug-ins, web browsers, stand-alone applications, and/or any other executable program, routine, and/or module. The client application 138 can include executable programs that are configured to execute on top of the OS 136 to provide various functions as illustrated and described herein. While only a client application 138 is shown in the UE 130 as illustrated in FIG. 1, it can be appreciated that various functionality illustrated and described herein can be performed and/or provided by multiple application programs, irrespective of execution on the UE 130 and/or remote from the UE 130 (e.g., on the network device 160). Similarly, it should be understood that various operations illustrated and described herein can be performed by the client application 138 and/or other application programs without departing from the scope of this disclosure. For clarification purposes only, the client application 138 is described and presented herein as at least facilitating presentation of instances of the user interface 137, which can be configured according to various embodiments, such as shown and discussed with respect to FIGS. 2A-2E. In some embodiments, the client application 138 may be associated with the wireless communication service 108 and/or the LMS 164, although this may not necessarily be the case. For purposes of discussion herein, at least one instance of the client application 138 on the UE 130 can receive instructions, commands, messages, information, and/or any other communication from the LMS 164, and therefore may perform one or more operations discussed herein based on one or more interactions with the LMS 164 and/or the wireless communication service 108. It is understood that the illustrated embodiment is illustrative of at least one contemplated embodiment and should not be construed as being limiting in any way.

In various embodiments, instances of the UE 130 can include a power source, such as a battery 142. In some embodiments, the battery 142 can be configured as a depletable power source, and as such, can be recharged, renewed, and/or replenished with energy so as to power the UE 130. It is understood that the UE 130 can include circuitry, connectors, regulators, power bus(es), and/or any other component and/or equipment that supports, facilitates, and/or enables the battery 142 to power and/or otherwise support operation of the UE 130. The battery 142 may be removeable and/or non-removable from the UE 130. In some embodiments, the UE 130 can determine and/or otherwise provide an indication of remaining power that is available for use by the UE 130, such as via a power indicator 143. In some embodiments, an instance of the power indicator 143 can include and/or correspond to the amount of charge remaining on the battery 142. The power indicator 143 may be presented in terms of a percentage (e.g., from 0%-100%) so as to indicate the relative amount of power remaining (e.g., 0% indicating depleted power supply and 100% indicating fully charged). By way of example, the battery 142 may power the UE 130 and be fully charged at 100% and fully depleted at 0%, and the power indicator 143 can correspond to a power level from 0% to 100%. In some embodiments, an instance of the power indicator 143 can include and/or correspond to another power supply available and/or used by the UE 130. For example, if an instance of the UE 130 is configured as a connected vehicle, then an instance of the power indicator 143 may represent the amount of fuel (e.g., gasoline, electric charge, and/or any other depletable power source) that the connected vehicle is able to use before at least a portion of the UE 130 ceases operation. For clarification purposes, the power indicator 143 illustrated in FIG. 1 is described as pertaining to an embodiment where the depletable power source for the UE 130 is the battery 142. Because this example is used to illustrate the concepts and technologies disclosed herein, it should be understood that this specific embodiment is illustrative, and therefore should not be construed as being limiting of the concepts and technologies disclosed herein in any way.

In some embodiments, the power indicator 143 can include and/or be configured as an identifier and/or indicia that can be compared against one or more threshold, such as a trigger power threshold 144 and/or a critical power threshold 146. In some embodiments, use of the term "first," "second," and/or another number may be applied to a particular instance of a power threshold (e.g., trigger power threshold 144 and/or the critical power threshold 146) for clarification purposes only. As such, although a certain number of instances may be illustrated, it is understood that reference to "first," "second," and/or any other specific number of instances is for illustration purposes only and therefore should not be construed as limiting in any way. It is understood that, as used herein, use of numbering (e.g., first, second, etc.) does not necessarily imply a hierarchy, preference, order, and/or worth. As such, it should be understood that the examples provided are for illustration purposes only, and therefore should not be construed as limiting in any way. In various embodiments, the trigger power threshold 144 and the critical power threshold 146 can be configured as data that can be stored within a memory (e.g., the memory 132 and/or the memory 162). The trigger power threshold 144 and/or the critical power threshold 146 can be configured to each provide an indicator that can be compared to an instance of the power indicator 143. For example, the power indicator 143 may be configured to present a current value (e.g., percentage and/or units relative to total capacity, such as present in milliamp-hours). The trigger power threshold 144 and/or the critical power threshold 146 can be provided in the same units as the power indicator 143 so as to allow for comparison of values. In some embodiments, the trigger power threshold 144 may correspond with a power level that is higher relative to the critical power threshold 146. In various embodiments, one or more operations may be performed and/or triggered in response to the power indicator 143 presenting a power level that is at and/or below one or more of the power thresholds, such as one of the trigger power threshold 144 and/or the critical power threshold 146. For example, in an embodiment, the trigger power threshold 144 may be defined and corresponding to a power level of 20% (i.e., 20% charge of the battery 142 remaining to power the UE 130), and the critical power threshold 146 may be defined and correspond to a power level of 5% (i.e., 5% charge of the battery 142 remaining to power the UE 130). In some embodiments, the trigger power threshold 144 and/or the critical power threshold 146 can be defined and/or customized by the user 129 and/or another device and/or service, such as the network device 160. In some embodiments, the trigger power threshold 144 and/or the critical power threshold 146 can have default values that are initially set and defined, but may be independently configurable and/or customized according to various embodiments. It is understood that the examples provided are for illustration purposes only, and therefore should not be construed as limiting in any way.

In some embodiments, the trigger power threshold 144 can correspond with a trigger event associated with the UE 130. For example, the trigger power threshold 144 may be set to a 20% power level. The client application 138 and/or the LMS 164 can consider a trigger event to occur if the power indicator 143 provides a current power level of the battery 142 that is at or below the trigger power threshold 144, according to an embodiment. In response to a trigger event, one or more operations may be performed by the UE 130 and/or the network device 160, as further discussed herein according to various embodiments.

In some embodiments, the LMS 164 can instantiate and/or otherwise configure the trigger power threshold 144 and/or the critical power threshold 146. In various embodiments, the critical power threshold 146 can indicate a power level of the battery 142 such that when the power indicator 143 meets and/or falls below the critical power threshold 146, then the UE 130 may have a default configuration to activate, execute, and/or initiate a shut-down routine on the UE 130, such as the shut-down routine 140. The shut-down routine 140 refers to executable instructions that provide a process that the UE 130 can perform prior to powering off the UE 130 (e.g., storing certain information in memory, shutting down various components in a defined order, etc.). In some embodiments, once the power indicator 143 falls below the critical power threshold 146, the UE 130 may attempt to invoke the shut-down routine 140 so as to begin powering down the UE 130 due to a lack of power in the battery 142 to sustain ongoing operations. For example, the critical power threshold 146 may be defined at a 5% power level, a 1% power level, and/or another power level (whether measured by percentage and/or relative to maximum charge in milliamp-hours), according to various embodiments. In some embodiments, invocation of the critical power threshold 146 and/or an attempt to initiate the shut-down routine 140 can be as an occurrence of a trigger event that causes the UE to perform one or more operations. For example, in some embodiments, the LMS 164 can generate a power allocation command, such as the power allocation command 168, that instructs the UE 130 to temporarily suspect execution of the shut-down routine 140 and use any remaining power of the battery 142 to report (and/or attempt to report) the location of the UE 130 (e.g., via an instance of the location data 148) prior to the battery 142 running out of power. In some embodiments, the LMS 164 can instruct, via the power allocation command 168, the UE 130 to suspend the shut-down routine 140 for powering off the UE 130 until after the UE 130 attempts to generate an instance of the location data 148 and/or report the location of the UE 130 to the LMS 164 (and/or to the network access point 106 that can relay the reported location to the LMS 164). The final instance of the location data 148 that is reported to the LMS 164 indicating a reported location of the UE 130 immediately prior to loss of connection with the wireless communication service 108 and/or the LMS 164 can indicate the final connection location 118.

In various embodiments, the LMS 164 can communicate with a device that is authorized to use and/or engage with the wireless communication service 108 and/or the LMS 164 via one or more service messages, such as a service message 182. The service message 182 can be directed to a particular device (e.g., the UE 130) and can be delivered and/or provided to the UE 130 via any available communication path, such as via one or more instance of the network access point 106. The service message 182 can include instructions, commands, communications, and/or any other information that can be communicated between the UE 130 and the LMS 164. For example, in some embodiments, the LMS 164 can generate and provide an instance of the power allocation command 168 to the UE 130 via an instance of the service message 182. It is understood that any other information that is to be communicated to the UE 130 can be provided via an instance of the service message 182.

In some embodiments, the UE 130 can provide various information to the LMS 164 by generating and transmitting an instance of a location management message ("LMM"), such as an LMM 180. In some embodiments, an instance of the LMM 180 can include an instance of the location data 148, an instance of the power indicator 143, identifying information, user input and/or selection, and/or any other information. In some embodiments, the identifying information can include any information that is associated with the UE 130, the client application 138, the account information 163, the wireless communication service 108, the network access point 106, and/or any other identifier that can serve to facilitate and support one or more operations discussed herein. For example, in an embodiment, the identifying information can include a UE identifier that can be used for identification purposes and any other use associated with the LMS 164, such as authorizing the UE 130 to use the LMS 164 based on identifying a corresponding instance of the account information 163. Examples of the UE identification can include but are not limited to, a serial number, an International Mobile Subscriber Identifier ("IMSI"), a Mobile Equipment Identifier ("MEID"), a telephone number, an Internet Protocol address, a profile number, an address, an e-mail address, a user-name, and/or one or more strings indicating a (unique) identity of the user equipment and/or any component associated therewith. In some embodiments, alternatively and/or additionally, an instance of the identifying information can include contact information for a third-party so that the third-party is authorized to be contacted by and/or access the LMS 164, such as to inform the third-party of location information about the UE 130. For example, the LMM 180 can include one or more designated contact identifiers 179 that are associated with a target device, such as the target device 192. The designated contact identifiers 179 can include any identifying information that can be used to communicate with the target device 192, such as but not limited to, a telephone number, an e-mail address, a user-name, and/or the like. The user input and/or selection can include any user input that can facilitate, support, interact, and/or communicate with the LMS 164.

In some embodiments, the LMS 164 can generate an instance of the service message 182 so as to allow at least some information about the final connection location 118 to be made available in a situation where the UE 130 does not have enough power to generate an instance of the location data 148. For example, in an embodiment, the UE 130 may determine that the amount of power left in the battery 142 is not enough—before shut-down—for the UE 130 to generate an instance of the location data 148 and thus identify the current location of the UE 130. In another embodiment, the UE 130 may be moving at a high rate of speed, and thus approaching the communication coverage edge 114 such that the location data 148 may not be generated in time for transmission to the LMS 164 before reception with the wireless communication service 108 is lost. Therefore, in various embodiments, the LMS 164 can instruct the UE 130 to generate a final connection flag 139 and send the final connection flag 139 to a network access point (e.g., the network access point 106) that is in communication with the UE 130 prior to shutting down and/or losing reception with the wireless communication service 108. The final connection flag 139 can trigger the network access point 106 to attempt to determine the location of the UE 130 on behalf of the UE 130 prior to shut-down of the UE 130. The final connection flag 139 can be configured as a link, an integer value, and/or a pointer that causes the network access point 106 to point to a network instruction (which may be independently provided from the LMS 164 to the network access point 106 that serves the UE 130), such as an access point configuration message 186.

In some embodiments, the access point configuration message 186 can inform one or more instances of the network access point 106 (i.e., each network access point that is has and/or could have a communication path with the UE 130) that priority should be given in handling any communication from the UE 130 (e.g., the final connection flag 139) so as to mitigate latency and/or delay in network handling, which in turn can improve resource utilization on the UE 130 by preventing the UE 130 from waiting for a network connection and shutting down before a final communication is sent from the UE 130. The access point configuration message 186 can instruct the network access point 106 to provide the LMS 164 with any location information about the UE 130. For example, in some embodiments, when an instance of the network access point 106 receives the final connection flag 139 and/or the access point configuration message 186, the network access point 106 can generate final connection data, such as the final connection data 184. An instance of the network access point 106 may generate an instance of the final connection data 184 associated with the UE 130, where the final connection data 184 can include a direction vector of the UE 130 (e.g., a vector that can include a velocity, a heading, a timestamp, and any other detectable information about the location of the UE 130 using a single instance of the network access point 106), a signal strength associated with the UE 130 at the time of final contact, and/or any other information, such as an identification associated with the UE 130 and/or an identification of the network access point 106 that provided the last connection to the UE 130. In some embodiments, the UE 130 may be at a location within the WCCA 111 such that the location of the UE 130 can be determined using more than one network access point (e.g., multiple instances of the network access point 106 that can coordinate via a trilateration process), and therefore, multiple instances of the final connection data 184 can be provided to the LMS 164. In some embodiments, the UE 130 may be in communication range of one instance of the network access point 106 such that the location of the UE 130 cannot be determined in three location dimensions (e.g., latitude, longitude, altitude), but rather as a unidirectional vector, and therefore only one instance of the final connection data 184 may be generated and provided to the LMS 164.

In some embodiments, the access point configuration message 186 can instruct the network access point 106 to temporarily withhold providing queued messages, such as the queued messages 167, to the UE 130 until the location of the UE 130 is reported by the UE 130. For example, if the UE 130 was about to run out of power and thus the UE 130 was shut down to preserve any remaining power in the battery 142, and/or if the UE 130 was outside of the WCCA 111 but later returns so as to be able to receive the wireless communication service 108, then once the UE 130 attempts to connect to the network access point 106, one or more of the queued messages 167 may be waiting to be sent to the UE 130. However, in some embodiments, the limited amount of power remaining on the UE 130 may be spent on receiving the queued messages 167 instead of generating an instance of the location data 148 before power is lost and the shut-down routine 140 is completed such that the UE 130 powers down. Therefore, to ensure that determination and detection of the location of the UE 130 is provided to the LMS 164, the access point configuration message 186 can cause the queued messages 167 directed to the UE 130 to be suspended and/or withheld until the UE 130 has transmitted and/or attempted to provide the location data 148 to the LMS 164 using any remaining power left in the battery 142. In some embodiments, if power remains in the battery 142 after the location data 148 has successfully been sent (while the queued messages 167 are withheld), then the access point configuration message 186 may authorize the network access point 106 to release and/or otherwise send the queued messages 167 to the UE 130. Examples of the queued messages 167 can include, but should not be limited to, any of a text message, an electronic mail message, a notification, a call, and application update, and/or any other message, communication, request, and/or the like.

In various embodiments, when the UE 130 receives an instance of the power allocation command 168, the UE 130 may determine and/or report a location of the UE 130. In some embodiments, the UE 130 may report a location of the UE 130 in response to a trigger event associated with the UE 130. Examples of a trigger event can include, but should not be limited to, an invocation of the shut-down routine 140 on the UE 130, the UE 130 approaching the communication coverage edge 114 (e.g., by detecting that the coverage trigger threshold 112 has been crossed), the UE 130 indicating a power level (e.g., by the power indicator 143) that is below a power threshold, such as the trigger power threshold 144 and/or the critical power threshold 146, and/or user input that requests reporting of the location (and thus generation of an instance of the location data 148).

In various embodiments, the reported location of the UE 130 can be received by the LMS 164 via the location data 148. In some embodiments, the reported location can indicate the location of the UE 130 at a corresponding time relative to the occurrence of the trigger event. For example, if the UE 130 detected a trigger event, such as any discussed above, in some embodiments, the LMM 180 can include a time stamp of when the trigger event occurred and a time of when the location of the UE 130 was determined (i.e., when an instance of the location data 148 was generated to provide the reported location of the UE 130). In some embodiments, the LMS 164 may continue to receive reports of the location of the UE 130, such as subsequent instances of the LMM 180 that has the reported location of the UE 130 with a corresponding time stamp. In some embodiments, two or more instances of the reported locations can be used to detect and/or determine that the UE 130 is approaching the communication coverage edge 114 of the WCCA 111. In some embodiments, the LMS 164 can generate a lost connection time estimate 169 for the UE 130 based on one or more reported locations of the UE 130 (e.g., any of the prior locations 116A-N). The lost connection time estimate 169 can provide an estimated amount of time before the UE 130 loses contact with the wireless communication service 108, such as by moving past the communication coverage edge 114.

In various embodiments, the LMS 164 can detect when the UE 130 is no longer receiving the wireless communication service 108. For example, the UE 130 can be instructed and/or configured to periodically provide and report a current and/or prior location (e.g., any of the final connection location 118 and/or any of the prior locations 116A-N) of the UE 130 at a defined reporting frequency, such as an expected reporting frequency 173. The expected reporting frequency 173 refers to how often the reported location of the UE 130 should be provided and reported to the LMS 164 over a defined time period, which in some embodiments, may begin following the occurrence of a trigger event associated with the UE 130. In some embodiments, the UE 130 can define and/or otherwise configure the expected reporting frequency 173. For example, in some embodiments, the expected reporting frequency 173 can cause the LMS 164 to instruct the UE 130 to report the location of the UE 130 at least one time every "X" time unit (e.g., every 30 seconds, 5 minutes, etc.). In some embodiments, when the LMS 164 receives the reported location of the UE 130 (e.g., via instance of the location data 148), the LMS 164 can update the most recently received location data 148 as the current location of the UE 130 and any previous instance of the location data 148 (since the time of the trigger event) may be designated as one of the prior locations 116A-N. In some embodiments, if the LMS 164 expects to receive the reported location of the UE 130, but the reported location is not provided to the LMS 164 in accordance with the expected reporting frequency 173, then the LMS 164 can determine that an actual reporting frequency 172 has fallen below the expected reporting frequency 173, and therefore the UE 130 may no longer be connected to and/or able to receive the wireless communication service 108. The LMS 164 may determine whether the location is being reported at a rate that is at least as often as defined by the expected reporting frequency 173. The LMS 164 can determine how often the location of the UE 130 is actually being reported, and therefore can generate and/or update an actual reporting frequency 172. If the network device 160 expects to receive the reported location of the UE 130 at the expected reporting frequency 173, but the actual reporting frequency 172 falls below the expected reporting frequency 173 (i.e., the location data 148 indicating the reported location is not received by the network device 160 at the expected time, such as due to the UE 130 losing power and/or losing connection with the wireless communication service 108 which causes the UE 130 to fail to report the location), then the LMS 164 may perform one or more operations in response. For example, if an instance of the location data 148 is not being reported by the UE 130 at the expected reporting frequency 173, then the LMS 164 may designate the last location which was reported as the final connection location 118 of the UE 130 prior to loss of connection with the wireless communication service 108 (e.g., due to the UE 130 experiencing power loss and/or being outside of the WCCA 111).

In some embodiments, the LMS 164 can create a final connection log, such as the final connection log 174. The final connection log 174 can include reported location records 175A-N that indicate the one or more reported locations of the UE 130 since the occurrence of a trigger event. For example, unlike call data records that may record every single interaction with the network 102, the final connection log 174 can track when a trigger event occurs on the UE 130 and provide an indication of one or more reported locations that the UE 130 traveled to prior to loosing connection with the wireless communication service 108. Therefore, in various embodiments, an instance of the final connection log 174 can include any reported locations of the UE 130 within a time span from the occurrence of the trigger event until the time that the UE 130 lost reception with the wireless communication service 108 and/or lost power of the battery 142. The instances of the location data 148 that are received following the trigger event and up until the UE 130 loses reception can be recorded within the reported location records 175A-N. Each of the reported location records 175A-N can correspond to a time stamp indicating a time at which the reported location was determined by the UE 130, such as the time stamps 178A-N.

In some embodiments, the LMS 164 can generate a device trail map, such as the device trail map 176, that is associated with the UE 130. The device trail map 176 can present one or more instances of reported locations of the UE 130 since the trigger event occurred. The device trail map 176 can provide a user interface 177 that presents a device trail 120 showing the path that the UE 130 traveled from an initial point in time (e.g., from the occurrence of the trigger event) to the last time of connection (e.g., the last time an instance of the location data 148 was generated before connection was lost with the wireless communication service 108). For example, in an embodiment, the device trail map 176 can present the device trail 120 that shows a path from the prior locations 116A-N to the final connection location 118. The device trail map 176 may include an overlay of streets, rivers, highways, and any other location feature that may indicate the relative path that the UE 130 traveled before losing connection with the wireless communication service 108. In some embodiments, the device trail map 176 can be finalized (i.e., no additional reported locations are collected as assigned to the device trail map 176) in response to a reported location not being received at the expected reporting frequency 173, and therefore the last reported location is designated as the final connection location 118 on the device trail map 176. In some embodiments, the device trail map 176 can include reported locations that begin at a time corresponding to the occurrence of the trigger event (e.g., one of the prior locations 116A-N) and end at the final connection location 118, which may be prior to the communication coverage edge 114 and within the WCCA 111. In some embodiments, the UE 130 may discontinue reporting the location data 148 due to the UE 130 no longer receiving the wireless communication service 108 based on being outside of the WCCA 111 and/or powering off the UE 130. In some embodiments, an instance of the device trail map 176 can include one or more reported locations that were previously provided prior to the occurrence of the trigger event, such as any of the prior locations 116A-N and/or the final connection location 118 from a prior instance of the device trail map 176 and prior instance of the final connection log 174. In some embodiments, another device trail map 176 can be generated at the first occurrence of another trigger event following the finalization of a prior device trail map.

In some embodiments, the LMS 164 can generate and/or create a service alert 166. In some embodiments, the service alert 166 can be presented on the UE 130 (e.g., via the user interface 137) so as to inform the user 129 that one or more operations have been performed prior to shut-down of the UE 130 and/or loss of reception with the wireless communication service 108 and/or the LMS 164. For example, in some embodiments, the service alert 166 can inform the UE 130 (while the UE 130 can still receive the wireless communication service 108 and/or prior to shut-down) that the final connection location 118 of the UE 130 has been reported to the LMS 164, and in some instances, the reported locations and/or any other information associated with the UE 130 may be made available to a designated party that can be informed and/or authorized to access the information about the UE 130 via the LMS 164. For example, an instance of the LMM 180 can provide one or more instances of the designated contact identifiers 179 to enable the LMS 164 to contact a designated party. The designated contact identifiers 179 can provide a contact identification for a target device, such as the target device 192. It is understood that an instance of the target device 192 may be configured at least similar to an instance of the UE 130. In some embodiments, the LMS 164 can generate a designated contact communication, such as the designated contact communication 190, that informs the target device 192 that the UE 130 is no longer receiving the wireless communication service 108. In some embodiments, the target device 192 can be designated by the UE 130 to receive the designated contact communication 190 after the UE 130 is no longer receiving the wireless communication service 108. In some embodiments, the designated contact communication 190 can authorize the target device 192 to access an instance of the device trail map 176 associated with the UE 130. By this, the target device 192 can be informed on the final connection location 118 of the UE 130.

In various embodiments, the LMS 164 can provide and/or enable a mobile communication device (e.g., the UE 130) to function according to one or more operating modes, such as the operating modes 165, so as to prioritize tasks and execution threads on the UE 130 before the UE 130 runs out of power, and/or prior to the UE 130 losing connection with the wireless communication service 108. The operating modes 165 can be selected and/or implemented independently and/or concurrently. The operating modes 165 can be configurable and/or customizable for a particular user and/or device (e.g., the user 129 and/or the UE 130). Examples of the operating modes 165 can include, but should not be limited to, a bread-crumb mode, a cell edge mode, a critical power mode, a customizable mode, or the like. In one or more of the operating modes 165, similar and/or dissimilar operations may be performed by the LMS 164 and/or the UE 130. A brief discussion of example operations that can be performed in one or more of the operating modes 165 will be provided, according to various embodiments. Further discussion of embodiments of the operating modes 165 is provided below with respect to FIGS. 2A-2D.

In an embodiment, the bread-crumb mode can instruct the UE 130 to send out a location (current and/or prior) at (ir)regular intervals based on a trigger event, such as user input selecting the bread-crumb mode, approaching the coverage trigger threshold 112, the battery falling below a predefined threshold, or another trigger event. The bread-crumb mode can cause the UE 130 to provide a set of locations that could be used to trace the path of the corresponding user, such as the user 129, within the WCCA 111 prior to loss of connection with the wireless communication service 108. For example, the bread-crumb mode may generate an instance of the device trail map 176 to present one or more of the prior locations 116A-N and/or the final connection location 118.

In an embodiment, the cell edge mode (which may also be referred to as a "last call" mode) can detect and/or determine the final connection location 118 corresponding to the last location within the WCCA 111 that the UE 130 was located before connection to the UE 130 was lost, such as due to loss of power and/or no longer receiving the wireless communication service 108. In some embodiments, the last known signal location of the wireless communication service 108 (e.g., the final connection location 118) and the time can be stored and/or presented to the user 129 of the UE 130. The location of the UE 130 can be updated and/otherwise reported to the LMS 164 at regular intervals. The location information provided by an instance of the location data 148 can be useful should the user 129 be in a location where a communication path is not available and the user 129 wants to return to a previous location where there was reception to the wireless communication service 108. In some embodiments, the UE 130 can receive an instance of the service alert 166 that informs the user 129 that the UE 130 is approaching the communication coverage edge 114. In some embodiments, the service alert 166 can provide the lost connection time estimate 169. In some embodiments, the LMS 164 can generate a return route instruction, such as the return route instruction 171. The return route instruction 171 can instruct the UE 130 to record the final connection location 118, and once the UE 130 loses reception to the wireless communication service 108, the UE 130 can use the GPS unit 135 to determine the disconnected location 122, and then determine a return route 124 between the disconnected location 122 and the final connection location 118. In some embodiments, the UE 130 can present a warning to the user 129 that the UE 130 only has enough power in the battery 142 to return to the final connection location 118 and send out a message, such as the location data 148. In some embodiments, the UE 130 can determine how fast and/or far the UE 130 is located from the final connection location 118, and based on the time and distance, the UE 130 can present the return route 124 that should be taken in order to return to the final connection location 118 before the battery 142 is depleted. In some embodiments, the UE 130 may only have enough power to transmit a message before the battery 142 is depleted, and therefore, in some embodiments, the access point configuration message 186 can instruct the network access point 106 (that the UE 130 returns to) to temporarily suspend the delivery of the queued messages 167 to the UE 130. In some embodiments, the user 129 can select an option on the UE 130 that provides an alert (audible and/or visual) when an area is without reception to the wireless communication service 108 and/or when the UE 130 returns to the WCCA 111, and thus communication with the wireless communication service 108 can be re-acquired.

In an embodiment, the critical power mode can instruct the UE 130 to prioritize any remaining power of the battery 142 so as to send out an instance of the location data 148 to report the location of the UE 130 to the LMS 164, specifically when the UE 130 is within range of the network access point 106. The UE 130 may suspend searching for a communication path to the wireless communication service 108 until the UE 130 independently travels back to the final connection location 118 and confirms (e.g., using the GPS unit 135) that the current location is the final connection location 118.

FIG. 1 illustrates the operating environment 100 having one or more instance of the network 102, the RAN 104, the wireless communication service 108, the network access point 106, the WCCA 111, the coverage trigger threshold 112, the communication coverage edge 114, the prior locations 116A-N, the final connection location 118, the UE 130, the processor 131, the memory 132, the communications transceiver 133, the signal strength 134, the GPS unit 135, the client application 138, the user interface 137, the OS 136, the shut-down routine 140, the battery 142, the power indicator 143, the trigger power threshold 144, the critical power threshold 146, the location data 148, the GPS 150, the satellites 152A-N, the GPS communication 153, the network device 160, the processor 161, the memory 162, the account information 163, the LMS 164, the queued messages 167, the operating modes 165, the service alert 166, the power allocation command 168, the lost connection time estimate 169, the signal strength threshold 170, the return route instruction 171, the actual reporting frequency 172, the expected reporting frequency 173, the final connection log 174, the reported location records 175A-N, the device trail map 176, the user interface 177, the time stamps 178A-N, the designated contact identifiers 179, the LMM 180, the service message 182, the final connection data 184, the access point configuration message 186, the designated contact communication 190, and the target device 192. It should be understood, however, that some implementations of the operating environment 100 can include zero, one, or more than one instances of the above listed elements of the operating environment 100 shown in FIG. 1. As such, the illustrated embodiment of the operating environment 100 is understood to be illustrative and should not be construed as being limiting in any way.

Figure 2B:
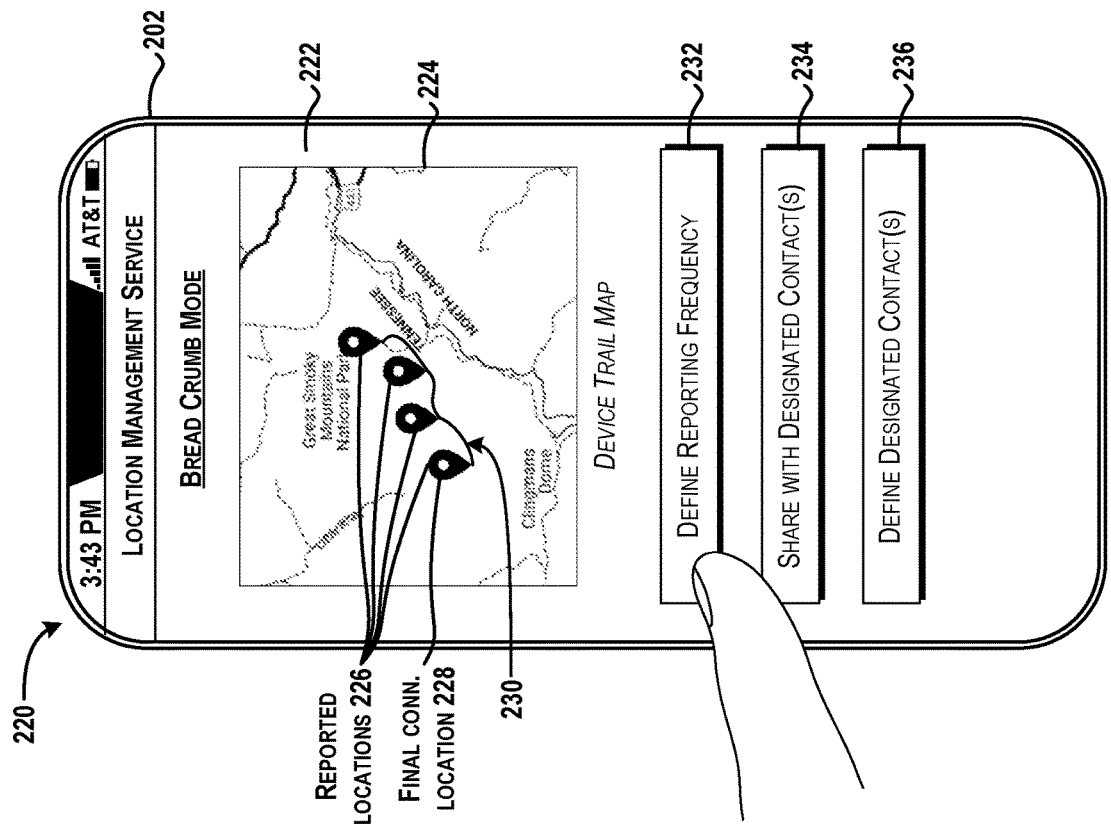
FIGS. 2A-E are user interface diagrams illustrating aspects of a location management service, according to various embodiments disclosed herein.
Figure 2A:
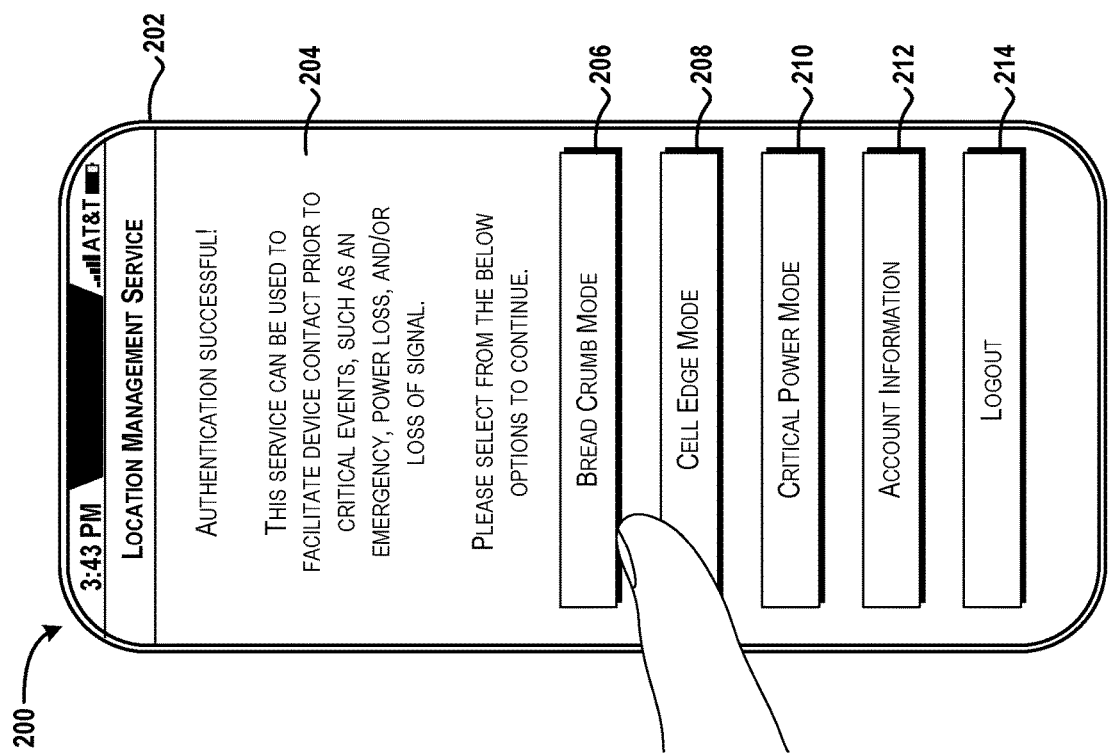

Turning now to FIG. 2A with continued reference to FIG. 1, a user interface diagram 200 illustrating aspects of providing a location management service will be described, according to an illustrative embodiment. In an embodiment, a UE 202 can present a user interface 204 that informs a user that the UE 202 is authenticated and authorized to access a location management service, such as the LMS 164 discussed with respect to FIG. 1. It is understood that the UE 202 can be an embodiment of the UE 130 discussed with respect to FIG. 1. As illustrated in FIG. 2A, one or more operating modes can be provided and presented so as to allow the user to select which operating mode and/or operating feature of the location management service to activate and/or otherwise make available. For example, in an embodiment, the user interface 204 can present operating modes that include a bread crumb mode 206, a cell edge mode 208, and a critical power mode 210, where each of the operating modes can correspond to one or more operating modes discussed with respect to FIG. 1. The user interface 204 can also present an account information option 212 that can allow the user to (re)configure account information pertaining to the user as recorded and/or otherwise made available to the location management service and/or a wireless communication service. The user interface 204 can present a logout option 214, which can allow the UE 202 to log out of a portal and/or application associated with the location management service.

In an embodiment, if a user selects the option button for the bread crumb mode 206, then a user interface discussed with respect to FIG. 2B may be presented, according to an embodiment. In an embodiment, if a user selects the option button for the cell edge mode 208, then a user interface discussed with respect to FIG. 2C may be presented, according to an embodiment. In an embodiment, if a user selects the option button for the critical power mode 210, then a user interface discussed with respect to FIG. 2D may be presented, according to an embodiment. It is understood that the examples provided are for illustration purposes only, and therefore should not be construed as limiting in any way.

Turning now to FIG. 2B with continued reference to FIG. 1 and FIG. 2A, a user interface diagram 220 illustrating aspects of providing a location management service will be described, according to another illustrative embodiment. The user interface diagram 220 can include the UE 202 presenting a user interface 222. The user interface 222 can provide a device trail map 224, which can be an embodiment of the device trail map 176 discussed with respect to FIG. 1. The device trail map 224 can present one or more instances of a reported location associated with the UE 202, such as the reported locations 226. In some embodiments, one of the reported locations 226 can correspond to the location where a trigger event occurred, which triggered the collection and recordation of location data for generation of the device trail map 224. One of the reported locations 226 can correspond to a final connection location 228, which can be presented as an embodiment of the final connection location 118 discussed with respect to FIG. 1. The device trail map 224 can present a device trail 230 that provides a path between the reported locations 226 up until the final connection location 228. The user interface 222 can include a define reporting frequency option 232, which can enable a user to define the expected reporting frequency 173 discussed with respect to FIG. 1. The user interface 222 can include a share with designated contact option 234, which can authorize a designated contact, such as the target device 192 discussed with respect to FIG. 1, to receive an instance of the designated contact communication 190 so as to provide information for the whereabouts of the UE 202 and/or enable the target device 192 to access the location management service, such as to access and/or be presented with an instance of the device trail map 224. The user interface 222 can include a define designated contact option 236, which can enable a user to provide identifying information corresponding to the target device 192, such as by providing the designated contact identifiers 179 to the location management service.

Figure 2D:
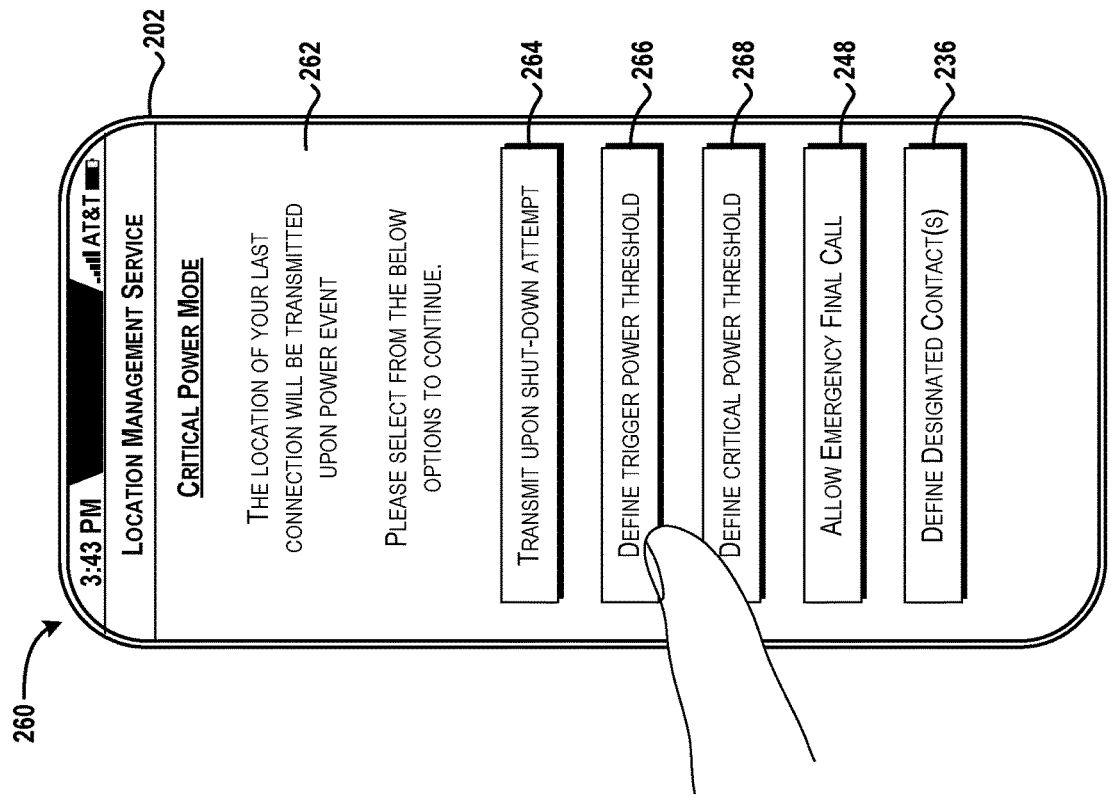
Figure 2C:
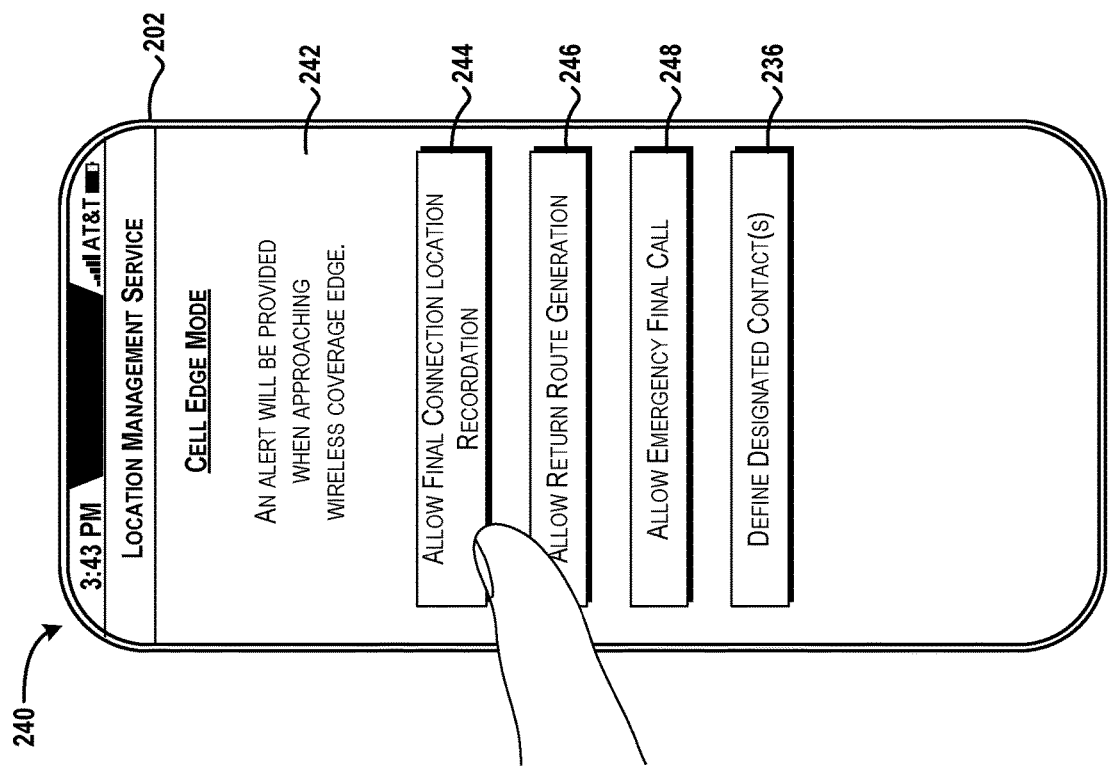

Turning now to FIG. 2C with continued reference to FIG. 1 and FIGS. 2A-2B, a user interface diagram 240 illustrating aspects of providing a location management service will be described, according to yet another illustrative embodiment. The user interface diagram 240 can include the UE 202 that presents a user interface 242, which can inform the user that the cell edge mode has been activated. In an embodiment, the user interface 242 can present an allow final connection location recordation option 244, which can authorize the location management service to determine and detect a final connection location for the UE 202 prior to loss of reception and/or loss of power. The user interface 242 can include an allow return route generation option 246, which can authorize the location management service to instruct the UE 202 to generate a return route (e.g., the return route 124 with respect to FIG. 1) from a disconnected location to the final connection location of the UE 202 so as to return to coverage within the wireless communication service. The user interface 242 can include and present an allow emergency final call option 248, which can instruct the UE 202 to generate a location data instance and authorize the location management service to identify a designated contact, and send the corresponding target device a designated contact communication. In some embodiments, the UE 202 can inform the user that the designated contact communication was sent before reception for the wireless communication service was lost. In some embodiments, the user interface 242 can include a define designated contact option 236, where the user can provide input and identifying information that can be send to the location management service and populate designated contact identifiers, such as discussed with respect to FIG. 1.

Turning now to FIG. 2D with continued reference to FIG. 1 and FIG. 2A, a user interface diagram 260 illustrating aspects of providing a location management service will be described, according to yet another illustrative embodiment. The user interface diagram 260 can include a UE 202 that can present a user interface 262, which can inform the user that a critical power mode has been activated. The user interface 262 can present and include a transmit upon shut-down attempt option 264, which can instruct the UE 202 to temporarily suspend execution of a shut-down routine and transmit the current location of the UE 202 to a network device that hosts the location management service. The user interface 262 can include a define trigger power threshold option 266, which can enable the user to define a trigger threshold that can correspond with an occurrence of a trigger event, such as the trigger power threshold 144 discussed with respect to FIG. 1. For example, the user can define 15% power of a battery of the UE 202 to be the trigger power threshold that provides a trigger event when the battery has a charge that falls below the trigger power threshold. The user interface 262 can include a define critical power threshold option 268, which can enable a user to define a critical power threshold (e.g., the critical power threshold 146 discussed with respect to FIG. 1). For example, the critical power threshold can trigger the UE 202 to attempt to execute a shut-down routine for powering off the UE 202, and therefore, the critical power threshold can enable the UE 202 to have enough power left to generate a location data instance and report the location of the UE 202 to the location management service. The user interface 262 can include an allow emergency final call option 248, which can be substantially similar and/or the same as discussed with respect to FIG. 2C. The user interface 262 can include a define designated contact option 236, which can be substantially similar and/or the same as discussed with respect to FIG. 2C.

Figure 2E:
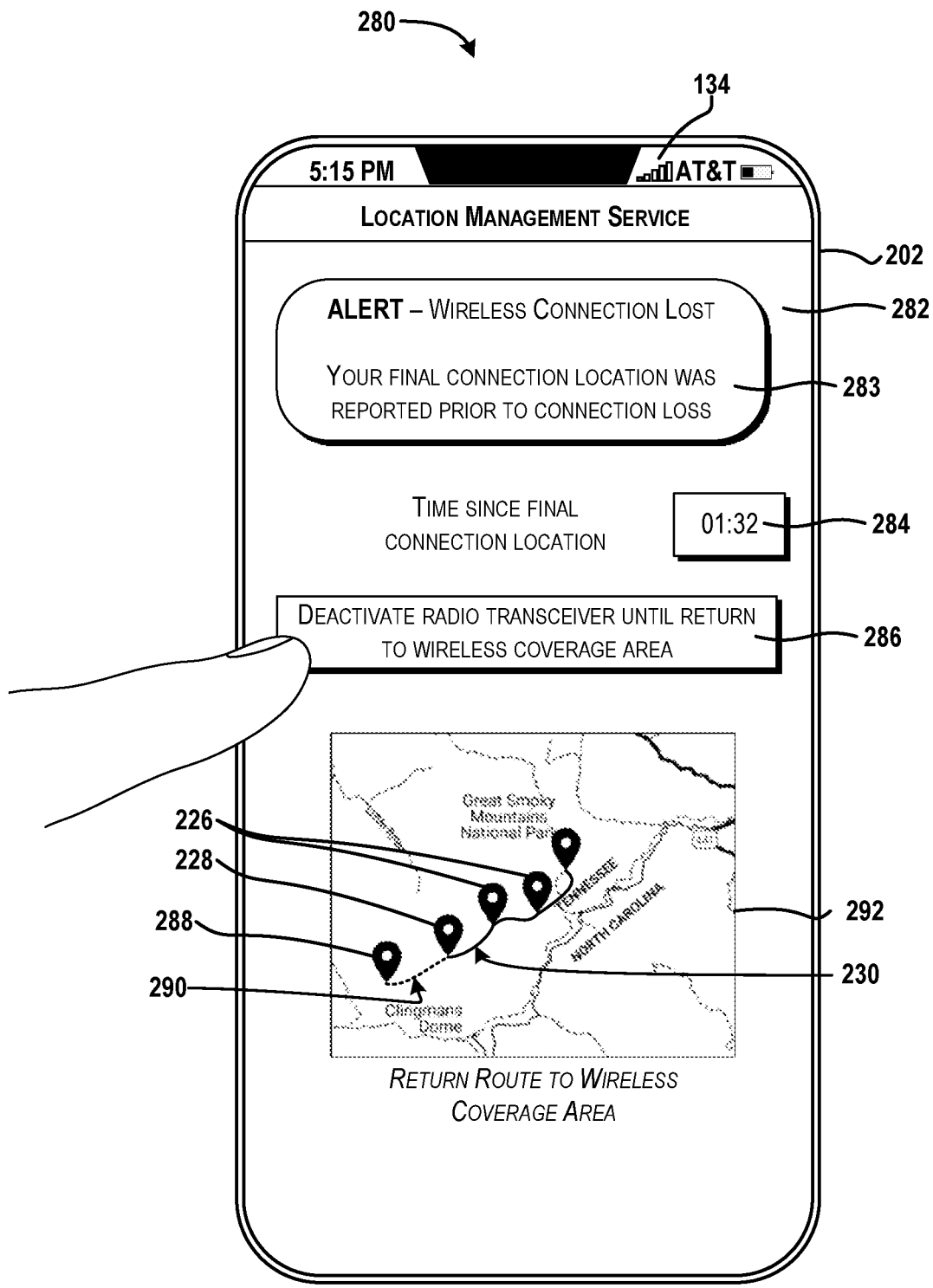

Turning now to FIG. 2E with continued reference to FIG. 1 and FIGS. 2A-2D, a user interface diagram 280 illustrating aspects of providing a location management service will be described, according to yet another illustrative embodiment. The user interface diagram 280 can include a UE 202 that presents a user interface 282. The user interface diagram 280 can correspond with a scenario where the UE 202 has traveled outside of the service boundary for the wireless communication service 108 (e.g., outside of the WCCA 111 and beyond the communication coverage edge 114 of the wireless communication service 108 shown in FIG. 1), which is indicated by the lack of signal strength bars showing no instance of the signal strength 134, such as discussed above with respect to FIG. 1. The UE 202 may be located at a disconnected location, such as the disconnected location 122. The user interface 282 can present a service alert 283, which can be an embodiment of the service alert 166 discussed with respect to FIG. 1. The service alert 283 can inform the user of the UE 202 that connection to the wireless communication service 108 was lost, but the final connection location 118 was reported prior to the loss of reception of the wireless communication service 108. As such, the UE 202 authorized that the reported location be provided to the location management service 164, which in turn could relay any information to the target device 192. In some embodiments, the user interface 282 can include a timer display 284, which counts up from the time since the final connection location was determined and reported to the network device 160 and/or the target device 192. In some embodiments, the UE 130 can be instructed by a power allocation command to deactivate a radio transceiver in order to save battery. In some embodiments, the UE 202 can still use the GPS unit 135, despite not receiving the wireless communication service. Therefore, the user interface diagram 280 can include a deactivate radio transceiver until the UE 130 returns to the WCCA 111 option 286. The user interface 282 can also present an embodiment a display trail map 292, which can be an embodiment of the device trail map 176. The display trail map 292 can include a device trail 230 that connects the reported locations 226 together. The display trail map 292 can also present the final connection location 228. The UE 202 may have received a return route instruction that instructs the UE 202 to determine the location of the UE 202 without reliance on the wireless communication service 108, such as by using the GPS unit 135. The display trail map 292 can present a disconnected location 288 of the UE 202, and a return route 290 that can lead the UE 202 back to the last position where the wireless communication service 108 was available, specifically the final connection location 228.

Turning now to FIGS. 3A, 3B, 4A, and 4B with continued references to FIGS. 1 and 2A-2E, aspects of a method 300, a method 340, a method 400, and a method 430 will be described in detail, according to various illustrative embodiments. It should be understood that each of the operations of the one or more methods disclosed herein (e.g., the method 300, the method 340, the method 400, and/or the method 430 discussed below) are not necessarily presented in any particular order and that performance of some or all of the operations in an alternate order(s) is possible and is contemplated. It is also understood that any of the operations from the methods disclosed herein may be combined or otherwise arranged to yield another embodiment of a method that is within the scope of the concepts and technologies discussed herein. The operations have been presented in the demonstrated order for ease of description and illustration, and therefore should not be construed as limiting the various embodiments disclosed herein. Operations may be added, omitted, and/or performed simultaneously and/or sequentially, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions stored and included on a computer storage medium, as defined herein. The phrases "computer executable instructions," and variants thereof (e.g., "computer-readable instructions"), as used herein, is used expansively to include routines, applications, modules, scripts, programs, plug-ins, data structures, algorithms, and the like. It is understood that any use of the term "module" (in the specification and claims) refers to a defined, callable set of computer-readable and executable instructions that, upon execution by a processor, configure at least a processor to perform at least a portion of one or more operations and functions discussed herein so as to transform, upon execution, processing resources and/or memory resources into a particular, non-generic, machine. Computer-readable instructions can be implemented on various system configurations including but not limited to one or more of single-processor or multiprocessor systems, minicomputers, user equipment, mainframe computers, personal computers, network servers, hand-held computing devices, microprocessor-based, programmable consumer electronics, a network platform, edge devices, vehicles, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system so as to provide a particular, non-generic machine device. The implementation is a matter of choice dependent on the performance and other requirements of the computing system. Accordingly, the logical operations described herein are referred to variously as states, operations, structural devices, acts, functions, instructions, and/or modules. These states, operations, structural devices, acts, functions, instructions, and/or modules may be implemented in software, in firmware, in special purpose digital logic, and any combination thereof. As used herein, the phrase "cause a processor to perform operations" and variants thereof is used to refer to causing and transforming a processor of a computing system or device, such as any component within one or more of the UE 130 and/or the network device 160 to perform one or more operations and/or causing one or more instances of a processor to direct other components of a computing system or device, to perform one or more of the operations.

Figure 6:
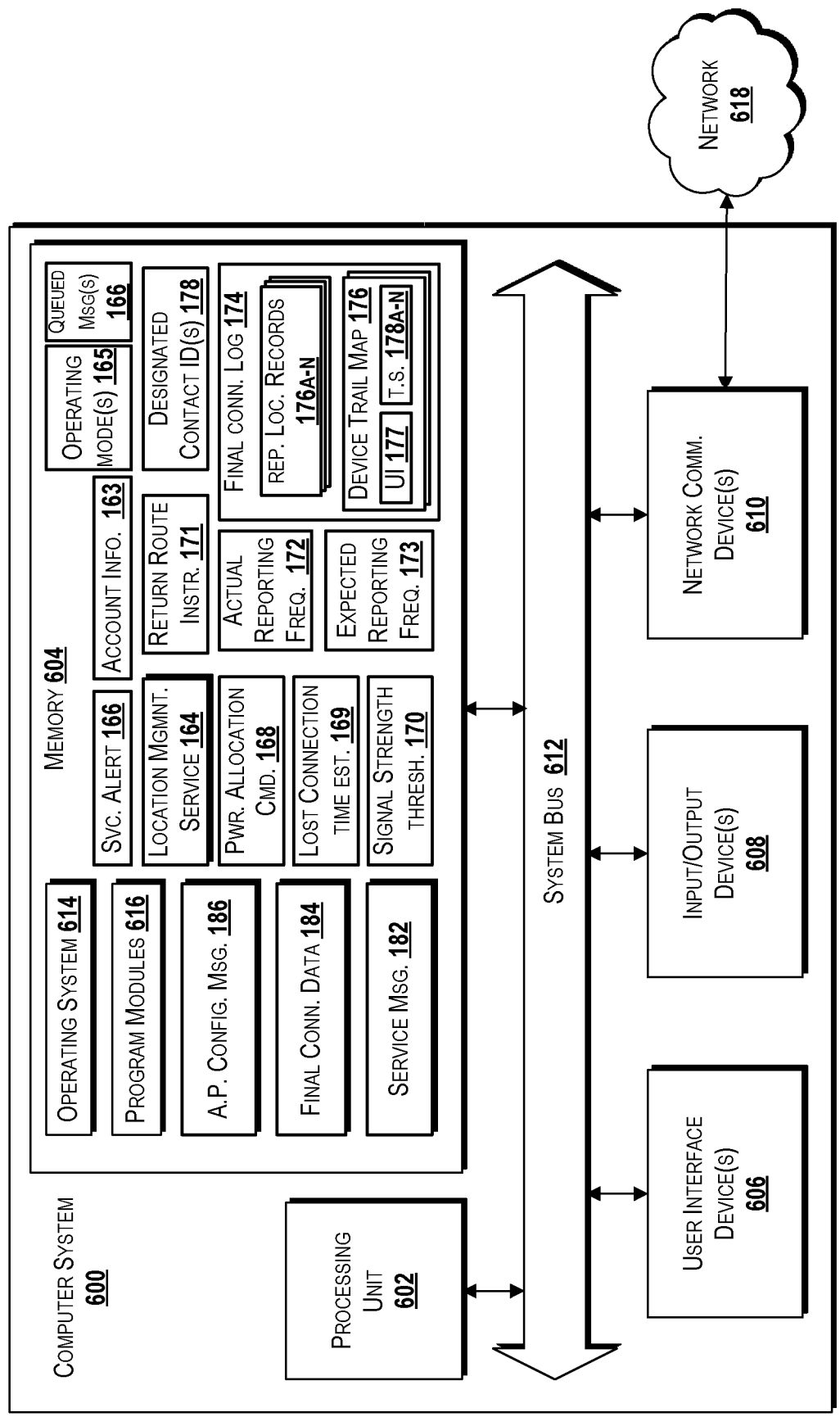
FIG. 6 is a block diagram illustrating an example computer system capable of implementing aspects of the embodiments presented and described herein.

For purposes of illustrating and describing the concepts of the present disclosure, one or more of the operations of methods disclosed herein are described as being performed by one or more instance of a system, such as the network device 160 and/or the UE 130 via execution of one or more computer-readable instructions configured so as to instruct and transform a processor, such as via execution of the LMS 164 and/or the client application 138 that can configure a processor (e.g., a processing unit discussed with respect to FIG. 6). It should be understood that additional and/or alternative devices and/or network infrastructure devices can, in some embodiments, provide the functionality described herein via execution of one or more routines, applications, and/or other software including, but not limited to, the power allocation command 168, the return route instruction 171, and/or any other computer executable instructions that can configure a device discussed herein, such as but not limited to one or more of the network access point 106 and/or the target device 192. Thus, the illustrated embodiments are illustrative, and should not be viewed as being limiting in any way. It should be understood that the examples provided are for illustration purposes only, and therefore should not be construed as limiting in any way. The method 300, the method 340, the method 400, and the method 430 will be described with reference to one or more of the FIGS. 1, 2A-2E, 3A, 3B, 4A, and 4B.

Figure 3A:
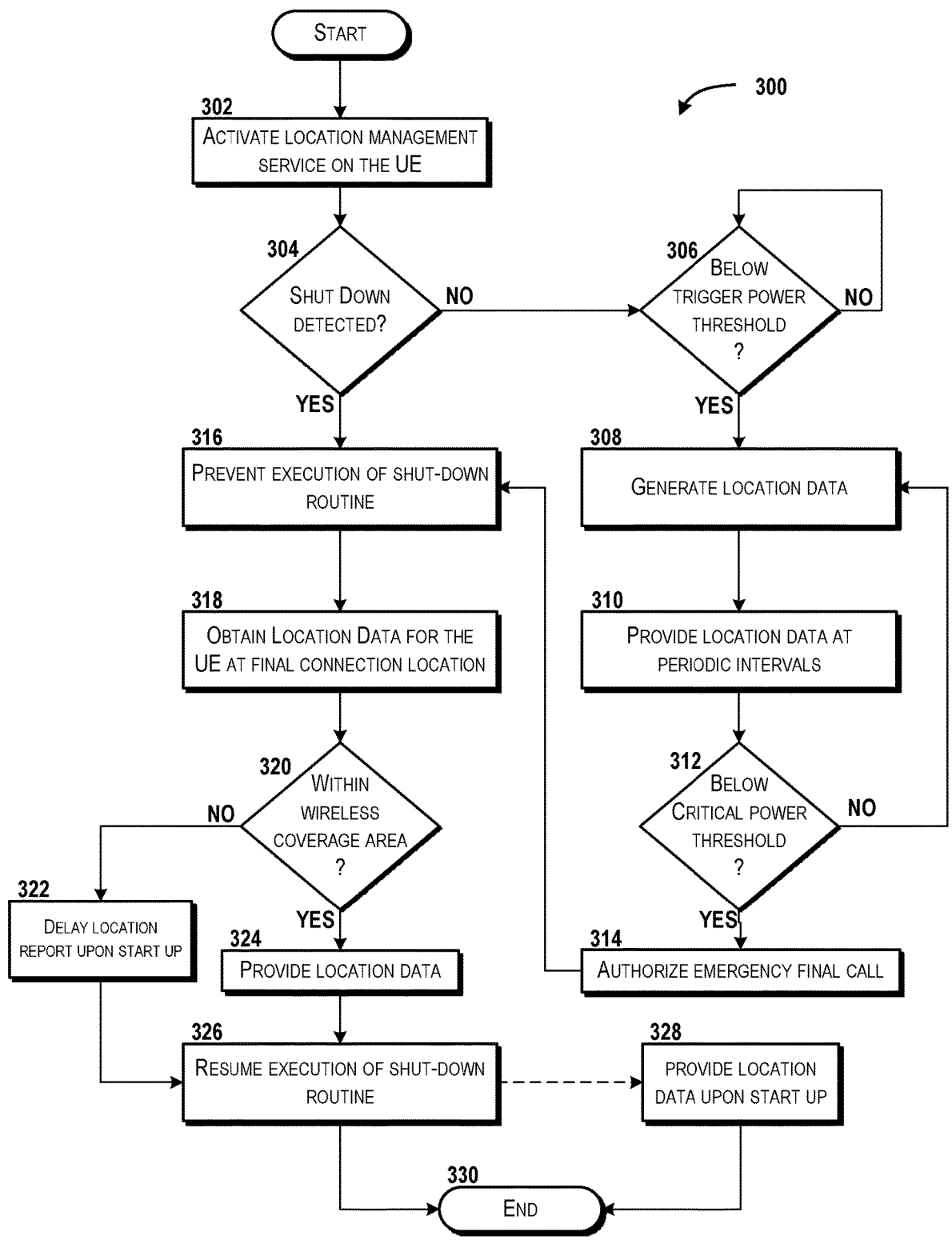
FIG. 3A provides a flow diagram illustrating aspects of a method of a location management service provided by a user equipment, according to an illustrative embodiment.

Turning now to FIG. 3A, the method 300 for providing a location management service is disclosed, according to an illustrative embodiment. In some embodiments, one or more operations of the method 300 can be implemented by the client application 138 executing on one or more instances of the UE 130. The method 300 can begin and proceed to operation 302, where the LMS 164 can be activated on the UE 130, such as by a user confirming that the client application 138 should monitor operations on the UE 130 so as to detect a trigger event associated with the UE 130. A trigger event can correspond to any of an invocation of a shut-down routine on the user equipment, the user equipment approaching a communication coverage edge, and/or the user equipment indicating a power level that is below a power threshold.

From operation 302, the method 300 can proceed to operation 304, where the UE 130 can determine whether shut-down of the UE 130 has been detected. In some embodiments, the UE 130 may detect that a manual shut-down input was provided to the UE 130 (e.g., from a user) to power off the UE 130, which in turn may cause the UE 130 to attempt to execute the shut-down routine 140. In some embodiments, the UE 130 may attempt to execute the shut-down routine 140 due to the battery 142 running low on power, and therefore the power indicator 143 being below the critical power threshold 146. Therefore, in some embodiments, if the UE 130 is attempting to execute the shut-down routine 140, then the method 300 may proceed along the YES path to operation 316. If the UE 130 is not attempting to execute the shut-down routine 140, then the method 300 may proceed along the NO path to operation 306. For clarity purposes only, a discussion of the method 300 following the NO path to operation 306 will be provided first, followed by a discussed of the operation 316 below.

At operation 306, the UE 130 can determine whether the power indicator 143 of the battery 142 is below the trigger power threshold 144. In some embodiments, if the power indicator 143 is not below the trigger power threshold 144, then the UE 130 may continue to monitor the power level of the battery 142, and therefore the method 300 may proceed along the NO path, where the operation 306 can repeat. In some embodiments, if the power indicator 143 is at or below the trigger power threshold 144, then the method 300 can proceed along the YES path to operation 308.

At operation 308, the UE 130 can generate an instance of the location data 148 that identifies the location of the UE 130 at a corresponding time. In some embodiments, the location data 148 may be recorded on the UE 130 for a defined amount of time. From operation 308, the method 300 can proceed to operation 310, where the UE 130 can provide the location data 148 to the network device 160 that supports the LMS 164. In some embodiments, the UE 130 may provide the location data 148 to the LMS 164 at a rate that is defined by the expected reporting frequency 173. From operation 310, the method 300 may proceed to operation 312, where the UE 130 can determine whether the power indicator 143 is below the critical power threshold 146 that would attempt to trigger shut-down of the UE 130 by attempting to execute the shut-down routine 140. In some embodiments, if the power indicator 143 of the battery 142 remains above the critical power threshold 146, then the method 300 may proceed along the NO path, where the method 300 may repeat operation 308 and operation 310. In some embodiments, if the power indicator 143 is at or below the critical power threshold 146, then the method 300 may proceed along the YES path to operation 314.

In some embodiments, at operation 314, the UE 130 can authorize an emergency final call to be placed and/or otherwise transmitted to a designated party. For example, the UE 130 may instruct the network device 160 to generate an instance of the designated contact communication 190 that is directed to the target device 192 based on the designated contact identifiers 179 defined by the user. The UE 130 may instruct the LMS 164 to generate and transmit the designated contact communication 190 to the target device 192 on behalf of the UE 130 so as to inform the target device 192 of one or more of the reported location of the UE 130 prior to powering off and/or loss of reception of the wireless communication service 108.

From operation 314, the method 300 may proceed to operation 316, where the UE 130 may prevent and/or temporarily suspend the execution of the shut-down routine 140. In some embodiments, the UE 130 may suspend the shut-down routine 140, and thus the powering off of the UE 130 at least until the location of the UE 130 is attempted to be determined and/or reported. From operation 316, the method 300 can proceed to operation 318, where the UE 130 can obtain and/or otherwise generate an instance of the location data 148 that indicates the final connection location 118 of the UE 130 within the WCCA 111. In some embodiments, if the battery 142 does not have enough power to generate the location data 148, the UE 130 may generate an instance of the final connection flag 139. It is understood that any remaining power on the battery 142 can be diverted and/or otherwise allocated to the determination, recording, and/or reporting of the location of the UE 130 and/or instructing the LMS 164 to contact the designated party prior to power loss on the UE 130.

From operation 318, the method 300 can proceed to operation 320, where the UE 130 can determine whether the UE 130 is within the WCCA 111, such as by confirming that a communication path between the UE 130 and the network access point 106 can be and/or is established. If the UE 130 is not able to receive the wireless communication service 108, then the method 300 may proceed along the NO path to operation 322, where the UE 130 can delay an attempt to provide the location to the LMS 164 prior to shut-down, and place an instruction on in the memory 132 of the UE 130 such that the location data 148 is reported to the LMS 164 upon the next start-up (i.e., power on) of the UE 130. From operation 322, the method 300 can proceed to operation 326, which will be discussed below. Returning to operation 320, if the UE 130 remains within the WCCA 111 and therefore can receive the wireless communication service 108, then the method 300 can proceed along the YES path to operation 324, where the UE 130 can provide the location data 148 to the LMS 164.

From operation 324, the method 300 may proceed to operation 326, where the UE 130 can resume execution of the shut-down routine 140 by withdrawing the temporary suspension of the shut-down routine 140. From operation 326, the method 300 may proceed to operation 330, where the method 300 may end. In another embodiment, the method 300 may proceed from operation 326 to operation 328, where the UE 130 may provide an instance of the location data 148 and/or the final connection flag 139 to an instance of the network access point 106 in response to the UE 130 being powered on and/or in response to the UE 130 returning to the WCCA 111 so as to be able to engage with the wireless communication service 108. It should be understood that the examples provided are for illustration purposes only, and therefore should not be construed as limiting in any way.

Figure 3B:
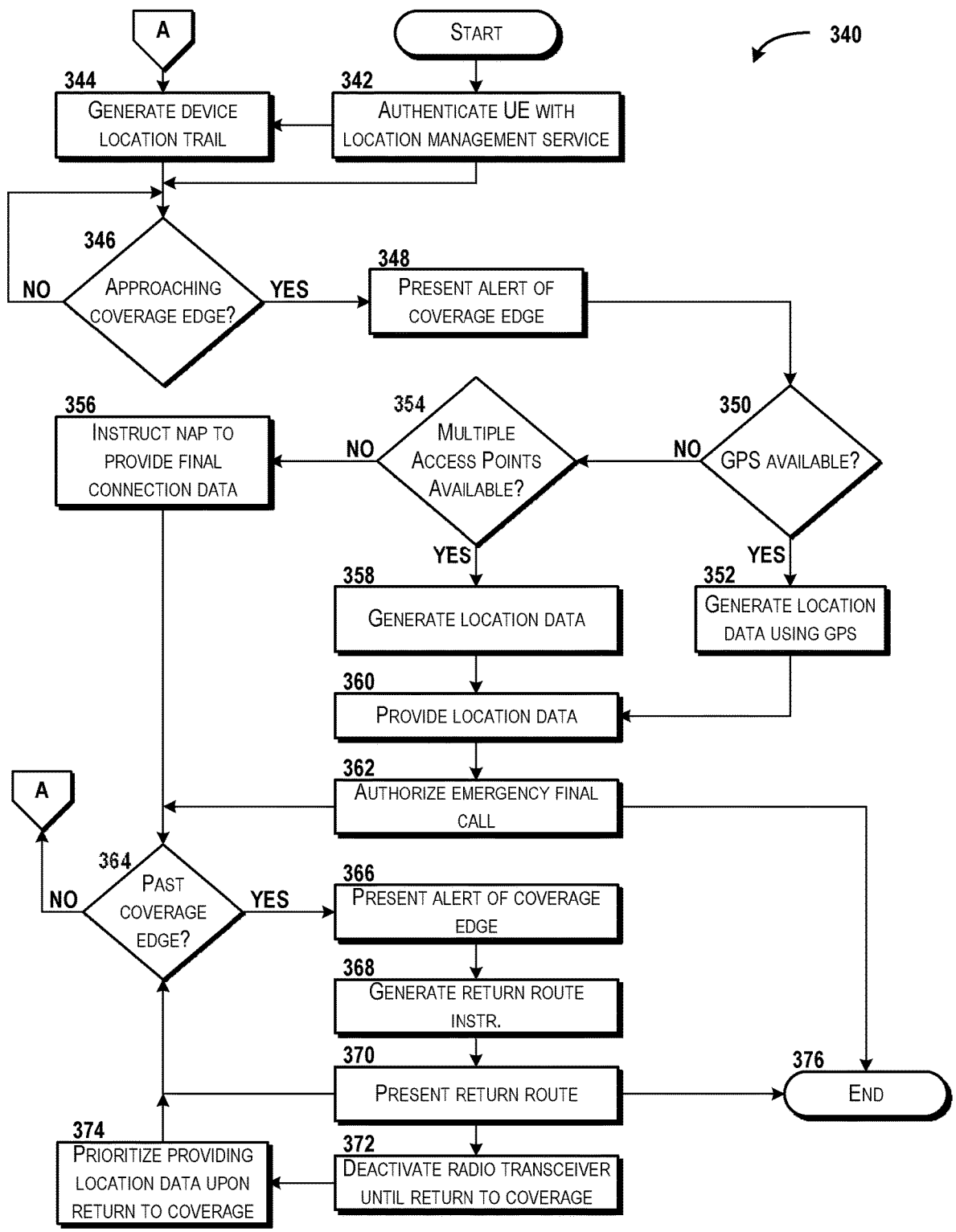
FIG. 3B provides a flow diagram illustrating aspects of another method of a location management service provided by a user equipment, according to an illustrative embodiment.

Turning now to FIG. 3B, the method 340 for aspects of a process for implementing a location management service is disclosed, according to an illustrative embodiment. In some embodiments, one or more operations of the method 340 can be implemented by the client application 138 executing on one or more instances of the UE 130. The method 340 can begin and proceed to operation 342, where the UE 130 can be authenticated with the LMS 164, such as by providing identifying information to the LMS 164 so as to establish the reported location records 175A-N with the LMS 164. In some embodiments, the method 340 may proceed from operation 342 to operation 344, where the UE 130 may generate a device location trail by determining multiple instances of the location of the UE 130 over a defined period of time. In some embodiments, the method 340 can proceed to operation 346, where the UE 130 can determine whether the UE 130 is approaching an instance of the communication coverage edge 114. For example, the UE 130 may report the location of the UE 130 to the LMS 164, and the LMS 164 can compare the reported location to known boundaries and/or thresholds associated with the WCCA 111 of the wireless communication service 108, such as the coverage trigger threshold 112. If the UE 130 is not approaching and/or is not located within a threshold distance of the communication coverage edge 114, then the method 340 may proceed along the NO path, where the operation 346 can repeat. In some embodiments, if the UE 130 is approaching and/or is located within a threshold distance of the communication coverage edge 114 (e.g., within the distance indicated by the coverage trigger threshold 112), then the method 340 can proceed along the YES path to operation 348.

At operation 348, the LMS 164 may identify that the UE 130 is approaching the communication coverage edge 114 and transmit an instance of the service alert 166 to the UE 130. The UE 130 can present the service alert 166 on the user interface 137 to inform the user 129 that the UE 130 is approaching the communication coverage edge 114. In some embodiments, the service alert 166 can include an instance of the lost connection time estimate 169 to inform the user 129 how long the UE 130 has at the current rate of travel before reception with the wireless communication service 108 will be lost.

From operation 348, the method 340 can proceed to operation 350, where the UE 130 can determine whether the UE 130 is located at a position where the GPS unit 135 can receive one or more instances of the GPS communication 153 from the satellites 152A-N of the GPS 150 so as to be able to determine an instance of the location data 148 that identifies the location of the UE 130. If the GPS 150 is available to the UE 130, then the method 340 may proceed along the YES path to operation 352, where the UE 130 can generate an instance of the location data 148 that is based on using the GPS unit 135. From operation 352, the method 340 can proceed to operation 360, which will be discussed below. Returning to operation 350, if the UE 130 determines that the GPS 150 is not available to the UE 130, then the method 340 can proceed along the NO path to operation 354, where the UE 130 can determine whether the UE 130 can communicate with multiple instances of the network access point 106 associated with the wireless communication service 108. If the UE 130 determines that only one instance of the network access point 106 is available for communication with the UE 130, then the method 340 may proceed along the NO path to operation 356, where the UE 130 may generate and send an instance of the final connection flag 139 to the network access point 106 so as to instruct the network access point 106 to provide an instance of the final connection data 184 to the LMS 164 on behalf of the UE 130. From operation 356, the method 340 may proceed to operation 364, which is discussed below in further detail. Returning to operation 354, if the UE 130 determines that more than one instance of the network access point 106 is available to communicate and provide the wireless communication service 108, then the method 340 may proceed along the YES path to operation 358.

At operation 358, the UE 130 can generate an instance of the location data 148 using any available location process, such as trilateration, multilateration, etc. From operation 358, the method 340 can proceed to operation 360, where the UE 130 can report the location of the UE 130 to the LMS 164 by providing the location data 148 to the network device 160. In some embodiments, from operation 360, the method 340 can proceed to operation 362, where the UE 130 can authorize an emergency final call to be generated and provided to a designated party, such as authorizing the LMS 164 to generate an instance of the designated contact communication 190 that is directed to the target device 192 based on the authorization to contact the party associated with the designated contact identifiers 179. In some embodiments, the method 340 may proceed from operation 362 to operation 376, where the method 340 may end. In other embodiments, the method 340 can proceed from operation 362 to operation 364.

At operation 364, the UE 130 can determine whether the UE 130 has traveled past the communication coverage edge 114, such as by detecting whether the UE 130 remains within range of receiving the wireless communication service 108 and therefore can communicate with the network access point 106. If the UE 130 remains within the WCCA 111 and has not yet moved past the communication coverage edge 114, then the method 340 may proceed along the NO path to operation 344 discussed above, where the UE 130 may continue to generate instances of the location data 148 and generate an instance of the device trail 120 that can be used to present within the device trail map 175. If the UE 130 is outside of the WCCA 111 and therefore has moved past the communication coverage edge 114, then the method 340 may proceed along the YES path to operation 366, where the UE 130 may present an instance of the service alert 166 on the user interface 137 so as to inform the user that the UE 130 is no longer within range to receive the wireless communication service 108 because the UE 130 is beyond the communication coverage edge 114.

From operation 366, the method 340 can proceed to operation 368, where the UE 130 can generate and/or execute an instance of the return route instruction 171. For example, the UE 130 can identify the final connection location 118 of the UE 130, and determine the current location of the UE 130, such as by using the GPS unit 135. The UE 130 can use the return route instruction 171 to generate an instance of the return route 124 that can direct the UE 130 back to the final connection location 118. From operation 368, the method 340 can proceed to operation 370, where the UE 130 can present the return route 124 to the user. In some embodiments, the method 340 can proceed from operation 370 to operation 372, where the UE 130 may deactivate a radio transceiver (e.g., the communications transceiver 133) until the UE 130 returns to the final connection location 118 and therefore is within the WCCA 111 and able to receive coverage by the wireless communication service 108. In some embodiments, from operation 372, the method 340 can proceed to operation 374, where the UE 130 can prioritize providing an instance of the location data 148 to the LMS 164 once the UE 130 returns to the WCCA 111. Therefore, the network access point 106 may be instructed to temporarily withhold any of the queued messages 167 until the UE 130 sends the location data 148 upon return to the final connection location 118 and/or anywhere within the WCCA 111. In some embodiments, the method 340 may proceed from either operation 370 or operation 374 to operation 364, which may be repeated. Returning to operation 370, in some embodiments, the method 340 may proceed from operation 376, where the method 340 may end.

Figure 4A:
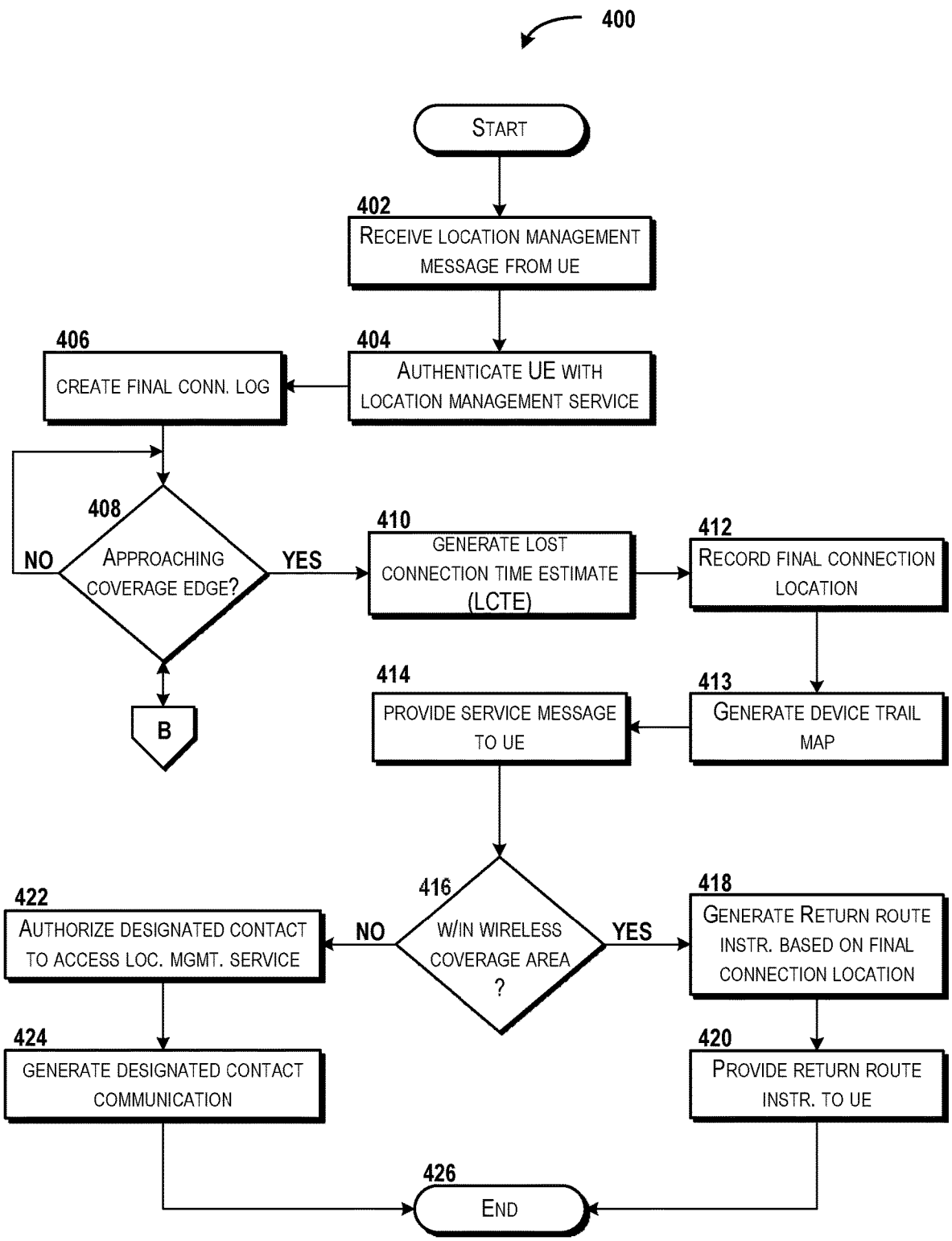
FIG. 4A provides a flow diagram illustrating aspects of a method of a location management service provided by a network device, according to an illustrative embodiment.

Turning now to FIG. 4A, the method 400 for implementing a location management service is disclosed, according to an illustrative embodiment. In various embodiments, one or more operations discussed herein may be performed by the LMS 164 executing on one or more instance of the network device 160.

In some embodiments, one or more operations of the method 400 can begin at operation 402, where the LMS 164 can receive an instance of the LMM 180 from the UE 130. From operation 402, the method 400 may proceed to operation 404, where the LMS 164 can authenticate the UE 130 with use of the LMS 164 by extracting identifying information from the LMM 180 and compared the information with the account information 163 that provides identities of authorized users of the LMS 164. From operation 404, the method 400 may proceed to operation 406, where the LMS 164 can create an instance of the final connection log 174 for the UE 130, and record one or more instances of the location data 148 from one or more instances of the LMM 180 within instances of reported location records 175A-N. In some embodiments, from operation 406, the method 400 may proceed to operation 408, where the LMS 164 can determine whether the UE 130 is approaching a communication boundary of the wireless communication service 108, such as by approaching an instance of the communication coverage edge 114. In some embodiments, the operation 408 can proceed to and/or be proceeded by one or more operations of the method 430 discussed with respect to FIG. 4B, such as the operation 436. If the UE 130 is not approaching the communication coverage edge 114, then the method 400 can proceed along the NO path, where the LMS 164 may repeat the operation 408. In some embodiments, the LMS 164 may continue to receive instances of the LMM 180 from the UE 130, and therefore may update the final connection log by generating additional instances of the reported location records, such as any of the reported location records 175A-N. In some embodiments, if the UE 130 is approaching the communication coverage edge 114, then the method 400 can proceed along the YES path to operation 410, where the LMS 164 can generate an instance of the lost connection time estimate 169. For example, the LMS 164 can determine the speed at which the UE 130 is traveling towards the communication coverage edge 114, and in turn can determine how long the UE 130 will remain within the WCCA 111 at the determined rate of travel. The lost connection time estimate 169 can be provided to the UE 130.

From operation 410, the method 400 may proceed to operation 412, where the LMS 164 can record the final connection location 118 of the UE 130 within the final connection log 174. For example, the LMS 164 can continue to receive instances of the LMM 180 that include an instance of the location data 148 that provides a reported location of the UE 130 at a corresponding time. The LMS 164 can extract and record the reported location within an instance of one of the reported location records 175A-N.

From operation 412, the method 400 may proceed to operation 413, where the LMS 164 can generate an instance of the device trail map 176 based on the reported location records 175A-N. From operation 413, the method 400 may proceed to operation 414, where the LMS 164 can provide an instance of the service message 182 to the UE 130, where the service message 182 can include, and/or otherwise make available, the device trail map 176.

From operation 414, the method 400 may proceed to operation 416, where the LMS 164 can confirm whether the UE 130 remains within the WCCA 111. In some embodiments, if the UE 130 remains within the WCCA 111, then the method 400 can proceed along the YES path to operation 418, where the LMS 164 can generate an instance of the return route instruction 171 based on the final connection location 118 that was indicated by the most recently received instance of the location data 148. From operation 418, the method 400 can proceed to operation 420, where the LMS 164 can provide the return route instruction 171 to the UE 130. In some embodiments, from operation 420, the method 400 may proceed to operation 426, where the method 400 may end.

Returning to operation 416, in some embodiments, the LMS 164 can determine that the UE 130 is no longer within the WCCA 111 and therefore the method 400 may proceed along the NO path to operation 422, where the LMS 164 can authorize a designated contact to access the LMS 164 and/or be provided with information associated with the reported locations of the UE 130 (e.g., the device trail map 176, the reported location records 175A-N, etc.). From operation 422, the method 400 may proceed to operation 424, where the LMS 164 can generate an instance of the designated contact communication 190 that is directed to the target device 192, which can be the designated party authorized to access the LMS 164 for location information associated with the UE 130.

From operation 424, the method 400 may proceed to operation 426, where the method 400 may end.

Figure 4B:
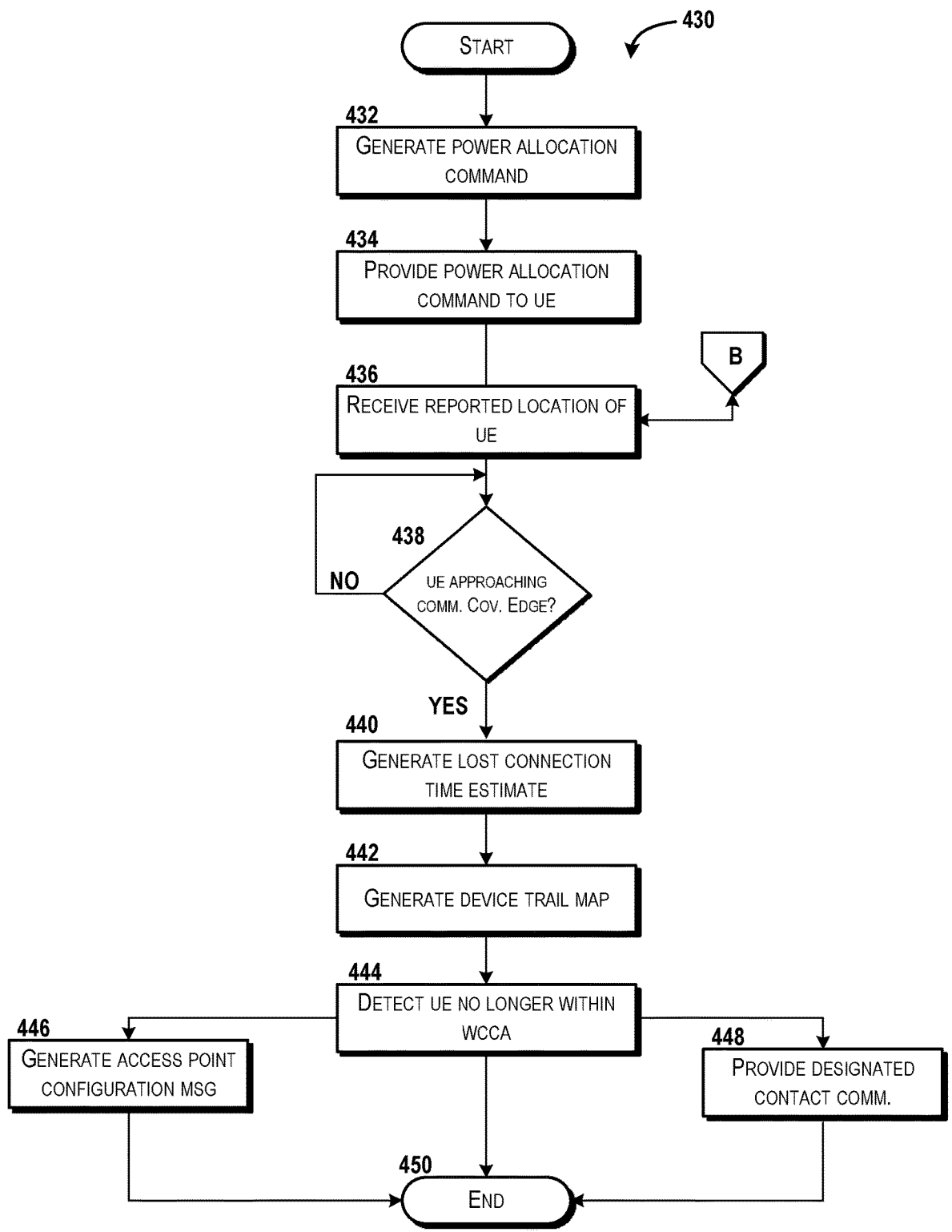
FIG. 4B is a flow diagram illustrating aspects of another method of a location management service provided by a network device, according to an illustrative embodiment.

Turning now to FIG. 4B, another method 430 for implementing a location management service is disclosed, according to an illustrative embodiment. In various embodiments, one or more operations discussed herein may be performed by the LMS 164 executing on one or more instance of the network device 160.

In various embodiments, the method 430 can begin and proceed to operation 432, where the LMS 164 can generate an instance of the power allocation command 168 that is directed to the UE 130. The power allocation command 168 can instruct the UE 130 to report a location of the UE 130 (e.g., via one or more instances of the location data 148) in response to a trigger event associated with the UE 130. In some embodiments, the trigger event can correspond to at least one of an invocation of the shut-down routine 140 on the UE 130 (e.g., the invocation being caused by user input and/or the battery 142 running out of power), the UE 130 approaching the communication coverage edge 114, or the UE 130 indicating a power level that is below a power threshold, such as the power indicator 143 being below the trigger power threshold 144 and/or the critical power threshold 146.

From operation 432, the method 430 can proceed to operation 434, where the LMS 164 can provide the power allocation command 168 to the UE 130. In some embodiments, the power allocation command 168 can instruct the UE 130 to (temporarily) suspend execution of the shut-down routine 140 for powering off the UE 130 until after the UE 130 attempts to report the location of the UE 130, such as via generating an instance of the location data 148 and sending an instance of the LMM 180.

From operation 434, the method 430 may proceed to operation 436, where the LMS 164 can receive a reported location of the UE 130, such as by receiving an instance of the LMM 180 that includes an instance of the location data 148 that identifies the reported location of the UE 130. In some embodiments, the reported location can indicate the location of the UE 130 at a corresponding time relative to occurrence of the trigger event, such as a time stamp that cause the generation of the location data 148. In some embodiments, one or more operations may proceed to, and/or precede from, the method 400, such as the operation 408.

From operation 436, the method 430 can proceed to operation 438, where the LMS 164 can determine and/or detecting whether the UE 130 is approaching the communication coverage edge 114 of the WCCA 111 (i.e., will be crossing the communication coverage edge 114 if the direction and rate of travel do not change). In some embodiments, if the LMS 164 detects that the UE 130 is not approaching the communication coverage edge 114, then the method 430 may proceed along the NO path, where the operation 438 may repeat. In some embodiments, if the LMS 164 detects and determines that the UE 130 is approaching the communication coverage edge 114 of the WCCA 111 corresponding to the wireless communication service 108, then the method 430 may proceed along the YES path to operation 440, which is discussed below.

At operation 440, the method 430 can include the network device 160 generating an instance of the lost connection time estimate 169 for the UE 130. The lost connection time estimate 169 can provide an estimated amount of time before the UE 130 loses contact with the wireless communication service 108, such as when the UE 130 will be moving past the communication coverage edge 114 and thus the network access point 106 will be out of communicative range of the UE 130. In various embodiments, the LMS 164 can provide the lost connection time estimate 169 to the UE 130 prior to the UE 130 leaving the WCCA 111.

From operation 440, the method 430 can proceed to operation 442, where the LMS 164 can generate an instance of the device trail map 176 that presents reported locations of the UE 130 since the trigger event occurred. In some embodiments, the device trail map 176 is finalized—and thus available for presentation—in response to the reported location not being received at the expected reporting frequency 173. In some embodiments, the device trail map 176 can include reported locations that begin at a time corresponding to the occurrence of the trigger event and end at the final connection location 118 prior to the communication coverage edge 114. In various embodiments, the LMS 164 can provide the device trail map 176 to the UE 130 prior to the UE 130 leaving the WCCA 111. In some embodiments, the device trail map 176 can be accessed by an authorized device, such as the target device 192.

From operation 442, the method 430 can proceed to operation 444, where the LMS 164 can detect that the UE 130 is no longer receiving the wireless communication service 108. For example, in some embodiments, the UE 130 may discontinue reporting the location to the LMS 164 due to the UE 130 no longer receiving the wireless communication service 108. By this, the LMS 164 may determine that the UE 130 is no longer located within the WCCA 111. In some embodiments, the method 430 may proceed from operation 444 operation 450, where the method 430 can end.

Returning to operation 444, the method 430 can proceed from operation 444 to operation 446, where the LMS 164 can generate an instance of the access point configuration message 186 that can instruct an instance of the network access point 106 to temporarily withhold providing one or more of the queued messages 167 to the UE 130. In some embodiments, the withholding of the queued messages 167 may occur until the location of the UE 130 reported. In some embodiments, the queued messages 167 can include at least one of a text message, an electronic mail message, a notification, or a call. In some embodiments, the method 430 may proceed from operation 446 to operation 450, where the method 430 can end.

Returning to operation 444, the method 430 can proceed from operation 444 to operation 448, where the LMS 164 can generate an instance of the designated contact communication 190 that informs an instance of the target device 192 that the UE 130 is no longer receiving wireless communication service 108, and/or any reported location information known about the UE 130. For example, in some embodiments, the target device 192 can be designated by the UE 130 to receive the designated contact communication 190 after the UE 130 is no longer receiving wireless communication service 108. In some embodiments, the designated contact communication 190 can authorize the target device 192 to access a device trail map 176 of the UE 130. In some embodiments, the method 430 may proceed from operation 448 to operation 450, where the method 430 can end.

Figure 5:
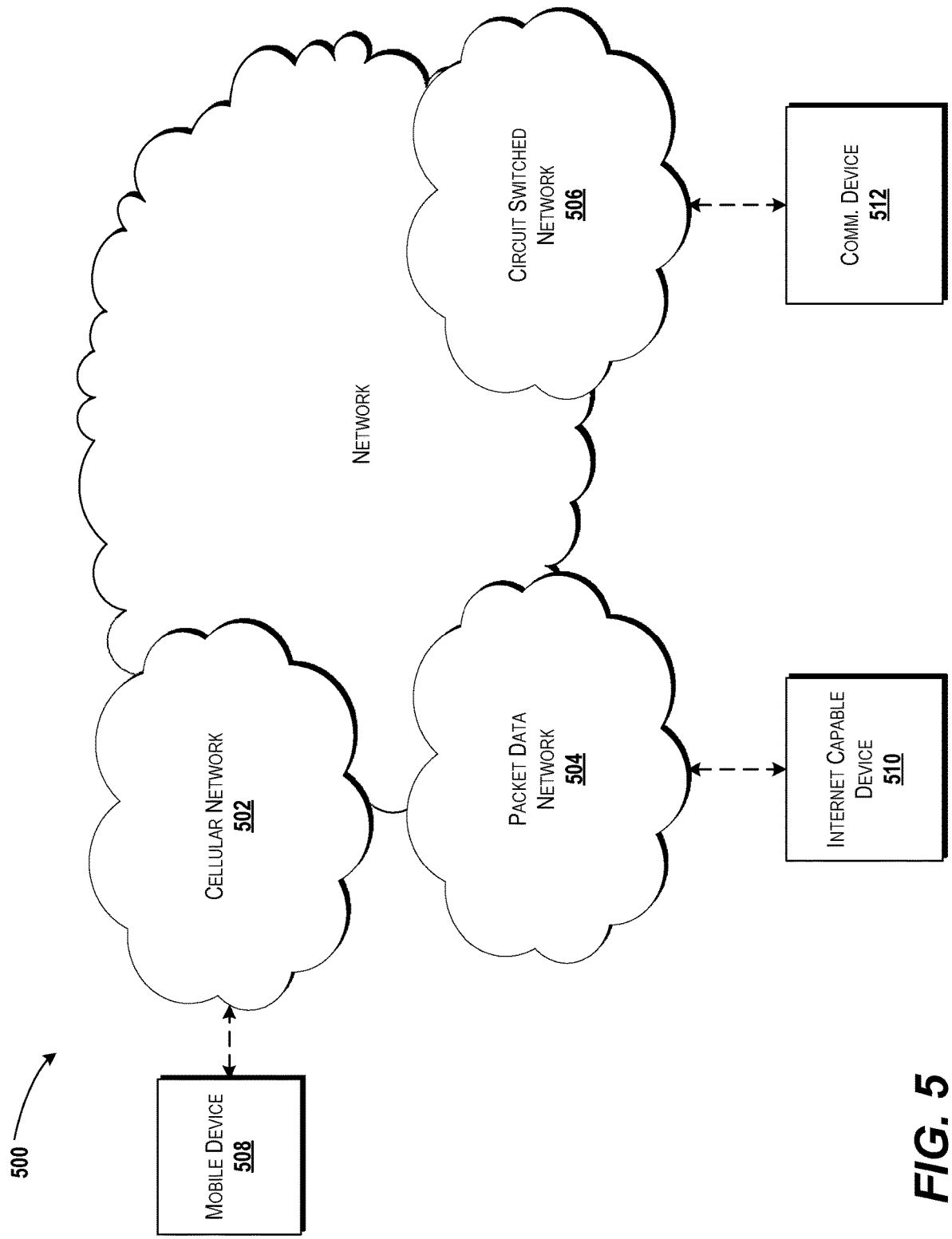
FIG. 5 is a diagram illustrating an example network capable of implementing aspects of the embodiments discussed herein.

Turning now to FIG. 5, a discussion of a network 500 is illustrated, according to an illustrative embodiment. In some embodiments, aspects of the network 102 and/or the RAN 104 shown in FIG. 1 can be configured substantially similar to include at least some of the elements of the network 500. The network 500 can include a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), node-B's ("NBs"), e-Node-B's ("eNBs"), g-Node-B's ("gNBs"), base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), 5G core components, 5G New Radio ("NR") components, functions, applications, (e.g., AMF, AUSF, UDM, SMF, PCF, AF, UPF, DN, or any other function corresponding to NR and/or industry standards as understood by one of ordinary skill in the technology), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also can be compatible with, and/or otherwise configured to implement and support, mobile communications standards such as but not limited to 4G, LTE, LTE Advanced, and/or 5G NR, as well as evolved and future mobile standards.

The packet data network 504 includes various devices, for example, servers, computers, databases, and other devices in communication with one another, as is generally understood. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" and/or "pointers" in the retrieved files, as is generally understood. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In some embodiments, the mobile communications device 508, the Internet-capable device 510, and/or the communication device 512 can correspond with one or more computer systems, devices, and/or equipment discussed with respect to FIG. 1, such as but not limited to the UE 130, target device 192, the network device 160, the network access point 106, and/or another computer system. In the specification, the network 102 and/or the network 500 can refer broadly to, in some embodiments, any combination of the networks 502, 504, 506. It should be appreciated that substantially all of the functionality described with reference to the network 102 and/or the network 500 can, in some embodiments, be performed by the cellular network 502, the packet data network 504, and/or the circuit switched network 506, alone or in combination with other networks, network elements, and the like.

FIG. 6 is a block diagram illustrating a computer system 600 that can be configured to provide the functionality described herein, in accordance with various embodiments of the concepts and technologies disclosed herein. In some embodiments, at least a portion of one or more of the network device 160, the target device 192, the UE 130, the network access point 110, and/or other components of the operating environment 100 illustrated and described herein can be configured as and/or can have an architecture similar or identical to the computer system 600. The computer system 600 includes a processing unit 602, a memory 604, one or more user interface devices 606, one or more input/output ("I/O") devices 608, and one or more network devices 610, each of which is operatively connected to a system bus 612. The system bus 612 enables bi-directional communication between the processing unit 602, the memory 604, the user interface devices 606, the I/O devices 608, and the network communication devices 610. In some embodiments, one or more elements of the operating environment 100 can include one or more instances of the processing unit 602 to support the execution and functionality of one or more operations discussed herein. For example, in some embodiments, one or more instances of the processing unit 602 can be implemented within one or more devices and/or components of the operating environment 100, such as but not limited to one or more of the UE 130, the target device 192, and/or another computer system of the operating environment 100. In some embodiments, one or more instances of the memory 604 can be implemented within one or more devices and/or components of the operating environment 100, such as but not limited to one or more of the UE 130, the target device 192, and/or another computer system of the operating environment 100. In various embodiments, one or more aspects of the network device 160 can be included within, or otherwise provided by, the computer system 600.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in sequence and/or parallel in a single machine or in multiple machines. Furthermore, processors and/or processing units can be used to support virtual processing environments. Processors and processing units also can include state machines, application-specific integrated circuits ("ASICs"), combinations thereof, or the like. As used herein, the phrase "processing unit" may be referred to as a "processor." The processing unit 602 can include one or more central processing units ("CPUs") configured with one or more processing cores. The processing unit 602 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the processing unit 602 can include one or more discrete GPUs. In some other embodiments, the processing unit 602 can include CPU and GPU components that are configured in accordance with a co-processing CPU/GPU computing model, wherein the sequential part of an application executes on the CPU and the computationally-intensive part is accelerated by the GPU. The processing unit 602 can include one or more system-on-chip ("SoC") components along with one or more other components including, for example, a memory, a communication component, or some combination thereof. In various embodiments, an instance of a processor (e.g., the processing unit 602) can be and/or can include one or more SNAPDRAGON SoCs, a cellular V2X ("C-V2X") chipset, and/or another architecture available from QUALCOMM of San Diego, Calif.; one or more TEGRA SoCs, XAVIER SoCs, and/or another architecture available from NVIDIA of Santa Clara, Calif.; one or more HUMMINGBIRD SoCs and/or another architecture available from SAMSUNG of Seoul, South Korea; one or more Open Multimedia Application Platform ("OMAP") SoCs and/or another architecture available from TEXAS INSTRUMENTS of Dallas, Tex.; one or more customized versions of any of the above SoCs; and/or one or more proprietary SoCs and/or proprietary circuitry capable of supporting V2X communication processing. In various embodiments, an instance of a processor (e.g., the processing unit 602) can be and/or can include one or more hardware components architected in accordance with an ARM architecture, available for license from ARM HOLDINGS of Cambridge, United Kingdom. Alternatively (or additionally), an instance of a processor (e.g., the processing unit 602) can be or can include one or more hardware components architected in accordance with an x86 architecture, such as an architecture available from INTEL CORPORATION of Mountain View, Calif., and others. Those skilled in the technology will appreciate that the implementation of a processor (e.g., the processing unit 602) can utilize various computation architectures, and as such, a processor (e.g., the processing unit 602) should not be construed as being limited to any particular computation architecture or combination of computation architectures, including those explicitly disclosed herein. Because processors and/or processing units are generally known to one of ordinary skill, the processors and processing units disclosed and discussed herein will not be described in further detail herein.

The memory 604 communicates with the processing unit 602 via the system bus 612. In embodiments, one or more instances of memory provided by the UE 130, the target device 192, and/or another computer system of the operating environment 100 can be configured at least similar to the memory 604. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software, program modules, or other computer readable and/or executable instructions that configure hardware resources of the computer system 600, such as but not limited to the processing unit 602 described herein. In some embodiments, for example, the program modules 616 can include the LMS 164, the client application 138, the operating modes 165, and/or other computer-executable instructions. These and/or other programs can be embodied in computer-executable instructions that, when executed by the processing unit 602, can facilitate performance of one or more of the methods 300, 340, 400, and/or 430 described in detail above with respect to FIGS. 3A, 3B, 4A, and 4B. According to some embodiments, the program modules 616 may be embodied in hardware, software, firmware, or any combination thereof. It should be understood that the memory 604 also can be configured to store one or more instance of information and data discussed with respect to FIGS. 1, 2A-2E, 3A, 3B, 4A, and 4B, such as but not limited to the access point configuration message 186, the final connection data 184, the service message 182, the service alert 166, the power allocation command 168, the lost connection time estimate 169, the signal strength threshold 170, the account information 163, the return route instruction 171, the actual reporting frequency 172, the expected reporting frequency 173, the operating modes 165, the queued messages 167, the designated contact identifiers 178, the final connection log 174, reported location records 176A-N, the device trail map 176, the user interface 177, the trigger power threshold 144, the critical power threshold 146, the power indicator 143, the final connection data 184, selection from user input, and/or other data, such as any data discussed herein, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrases "memory," "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices that can communicate with the computer system 600. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network communication devices 610 enable the computer system 600 to communicate with other networks or remote systems via a network, such as network 618. Examples of network communication devices 610 include, but are not limited to, a modem, a radio frequency ("RF") transceiver and/or infrared ("IR") transceiver, a telephonic interface, a bridge, a router, or a network card. The network 618 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 618 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN"). In some embodiments, the network 618 may include one or more aspects of the network 500, discussed above. It should be understood that the examples provided are for illustration purposes only, and therefore should not be construed as limiting in any way.

Figure 7:
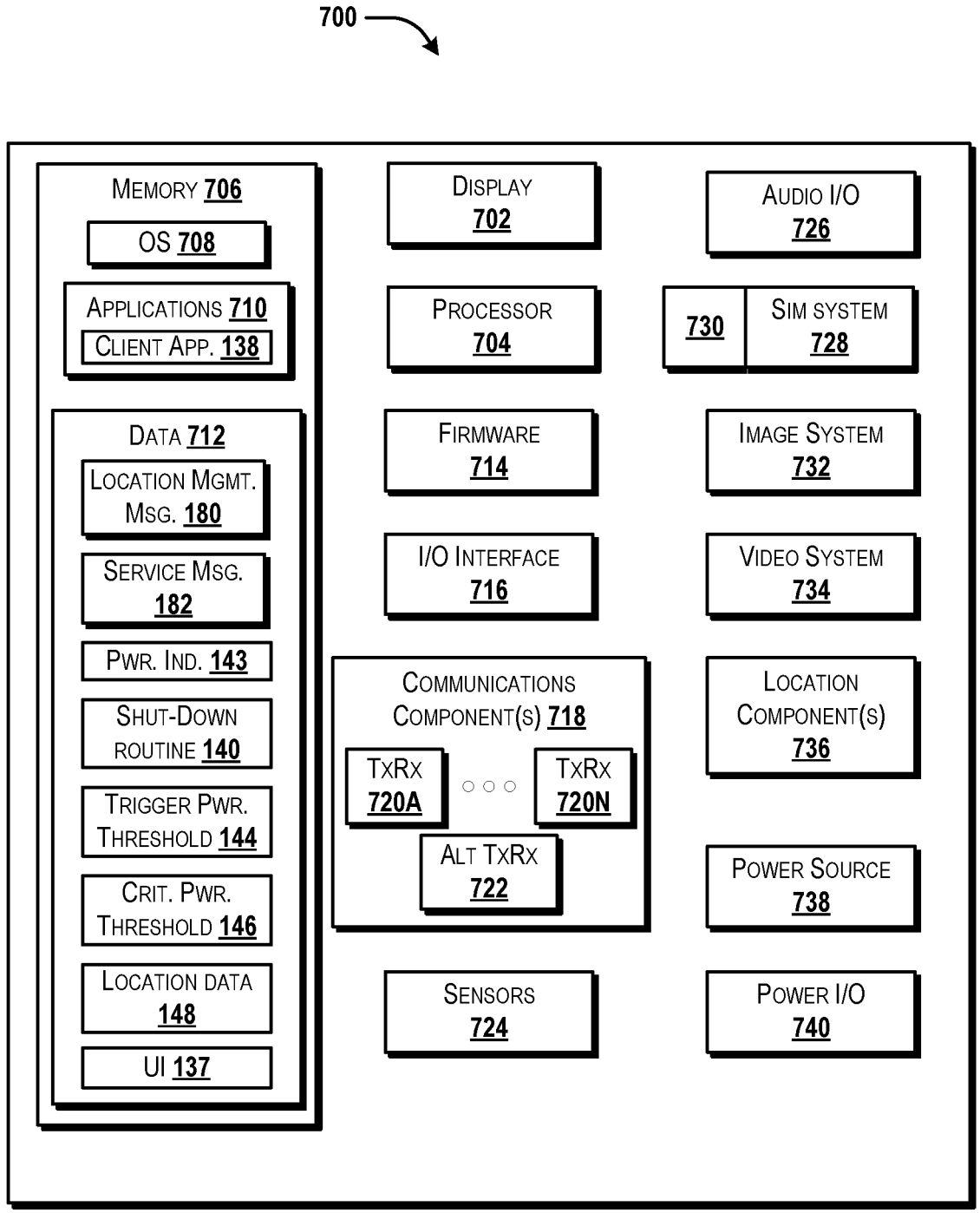
FIG. 7 is a diagram illustrating an example user equipment capable of implementing aspects of the concepts and technologies described herein according to embodiments of the present disclosure.

Turning now to FIG. 7, an illustrative user equipment 700 and components thereof will be described. In some embodiments, the UE 130, the target device 192, and/or other devices illustrated and described herein can be configured as and/or can have an architecture similar or identical to the user equipment 700 described herein in FIG. 7. It should be understood, however, that the various devices illustrated and described herein may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). In various embodiments, aspects from one or more the UE 130, the target device 192, or another computer system can be configured or otherwise implemented in the user equipment 700. As such, an instance of the UE 130 and/or the target device 192 may be configured according to one or more aspects of the user equipment 700 discussed herein. Thus, it should be understood that FIG. 7 and the following description are intended to provide a general understanding of a suitable environment in which various aspects of embodiments can be implemented, and should not be construed as being limiting in any way.

As illustrated in FIG. 7, the user equipment 700 can include a display 702 for presenting data and information. According to various embodiments, the display 702 can be configured to present various graphical user interface ("GUI") elements for presenting and/or modifying information associated with audiovisual content, an audiovisual content filter, presenting text, images, video, virtual keypads and/or keyboards, messaging data, notification messages, metadata, internet content, device status, time, date, calendar data, device preferences, map and location data, combinations thereof, and/or the like. The user equipment 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as a display application that can present various communications, messages, and/or other computer-executable instructions stored in a memory 706, or the like. In some embodiments, the applications 710 also can include a UI application (not illustrated in FIG. 7) and/or software applications that can execute on the various user equipment to, for example, facilitate the digital capture of objects by an acquisition device of the image system 732, such as a camera.

One or more applications and/or computer readable instructions can interface with the operating system 708 to facilitate any of the operations discussed herein and functionality for presenting content and/or data stored at and/or received by the user equipment 700 and/or stored elsewhere. It is understood that one or more instances of the operating system 708 may be included and operate within one or more systems discussed with respect to the operating environment 100, such as but not limited to UE 130, the target device 192, and/or the network device 160. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

An application can be executed by the processor 704 to aid a user in presenting a user interface, content, and/or data (e.g., the user interface 137, the LMM 180, the service message 182, and/or any other message, data, and/or information discussed herein), presenting a various communications, providing input or other information about the user equipment 700, presenting an identifier, configuring settings, manipulating address book content and/or settings, multimode interaction, interacting with other applications 710, and otherwise facilitating user interaction with the operating system 708, the applications 710, and/or other types or instances of data 712 that can be stored at the user equipment 700, such as stored by the memory 706. In some embodiments, the applications 710 can include the client application 138. According to various embodiments, the data 712 can include, for example, instances of the LMM 180, the service message 182, the power indicator 143, the shutdown routine 140, the trigger power threshold 144, the critical power threshold 146, the location data 148, the user interface 137, any other elements discussed with respect to FIGS. 1, 2A-2E, 3A, 3B, 4A, 4B, 5, and/or 6, presence applications, map applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The user equipment 700 also can include an input/output ("I/O") interface 716. One or more instances of the I/O interface 716 can be included any system and/or device discussed in FIG. 1. The I/O interface 716 can be configured to support the input/output of data such as a message, communication, command, and/or instruction, and/or any other information or elements discussed with respect to FIGS. 1, 2A-2E, 3A, 3B, 4A, and 4B, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, any other USB variant, an audio jack, a PS2 port, an IEEE 1394 ("FIREWIRE") port, a serial port, a parallel port, an Ethernet (RJ45) port, an RJ11 port, a standardized port, a proprietary port, combinations thereof, or the like. In some embodiments, the user equipment 700 can be configured to synchronize with another device to transfer content to and/or from the user equipment 700. In some embodiments, the user equipment 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the user equipment 700 and a network device or local device.

The user equipment 700 also can include a communications component 718. The communications component 718 can be configured to interface with the processor 704 to facilitate wired and/or wireless communications with one or more networks (e.g., the network 102, the RAN 104, and/or the network 500) and/or a network device (e.g., the network access point 106, the network device 160, etc.) described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks. The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, LTE, LTE Advanced, 5G New Radio, and greater generation technology standards. Moreover, the communications component 718 may facilitate communications over various channel access methods (which may or may not be used by the aforementioned standards) including, but not limited to, TDMA, FDMA, W-CDMA, OFDMA, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like. In some embodiments, the communications component 718 can support one or more communication modes, such as a direct transmission mode over a PC5 interface and/or the network transmission mode over a Uu interface. In some embodiments, the communications component 718 can support wireless communication using a low-power wide area network technology, such as but not limited to, Narrow Band Internet of Things and/or LTE-Machine Type Communication (e.g., LTE-CatM1).

The user equipment 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the user equipment 700 may be provided by an audio I/O component 726. The audio I/O component 726 of the user equipment 700 can include one or more speakers for the output of audio signals, one or more microphones for the collection and/or input of audio signals, and/or other audio input and/or output devices. In some embodiments, the audio I/O component 726 may be included as a component of the display 702. For example, in some embodiments, the display 702 can provide and present visual images and/or audio input and/or audio output. In some embodiments, the I/O interface 716 can include direct communicative coupling with the display 702 and/or the audio I/O component 726 so as to provide transfer and input and/or output of visual images (e.g., from the display 702) and/or audio clips (e.g., from the audio I/O component 726) to and/or from the user equipment 700.

The illustrated user equipment 700 also can include a subscriber identity module ("SIM") system 728. The SIM system 728 can include a universal SIM ("USIM"), a universal integrated circuit card ("UICC"), a virtual SIM, and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the user equipment 700 are contemplated, it should be understood that these embodiments are illustrative, and should not be construed as being limiting in any way.

The user equipment 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The user equipment 700 may also include a video system 734. The video system 734 can be configured to capture, process, record, modify, and/or store video content. Photos and videos obtained using the image system 732 and the video system 734, respectively, may be added as message content to an MMS message, email message, and sent to another user equipment. The video and/or photo content also can be shared with other devices via various types of data transfers via wired and/or wireless user equipment as described herein.

The user equipment 700 also can include one or more location components 736. The location components 736 can be configured to send and/or receive signals to determine a geographic location of the user equipment 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the user equipment 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the user equipment 700. Using the location component 736, the user equipment 700 can generate and/or receive data to identify its geographic location, or to transmit data used by other devices to determine the location of the user equipment 700. The location component 736 may include multiple components for determining the location and/or orientation of the user equipment 700.

The illustrated user equipment 700 also can include a power source 738. The power source 738 can include one or more batteries, power supplies, power cells, and/or other power subsystems including alternating current ("AC") and/ or direct current ("DC") power devices. The power source 738 also can interface with an external power system or charging equipment via a power I/O component 740. Because the user equipment 700 can include additional and/or alternative components, the above embodiment should be understood as being illustrative of one possible operating environment for various embodiments of the concepts and technologies described herein. The described embodiment of the user equipment 700 is illustrative, and therefore should not be construed as being limiting in any way.

Based on the foregoing, it should be appreciated that concepts and technologies directed to a location management service that facilitates power allocation at a wireless network coverage edge have been disclosed herein. Although the subject matter presented herein has been described in language specific to computer structural features, methodological and transformative acts, specific computing machinery, and computer-readable mediums, it is to be understood that the concepts and technologies disclosed herein are not necessarily limited to the specific features, acts, or mediums described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

What is claimed is:

1. A system comprising:
    a processor; and
    a memory that stores computer-executable instructions that, in response to execution by the processor, cause the processor to perform operations comprising:
        generating a power allocation command directed to a user equipment, wherein the power allocation command instructs the user equipment to report a location of the user equipment in response to a trigger event associated with the user equipment,
        providing the power allocation command to the user equipment,
        generating an access point configuration message that instructs a network access point to temporarily withhold providing queued messages to the user equipment until the location of the user equipment is reported,
        receiving a reported location of the user equipment, wherein the reported location indicates the location of the user equipment at a corresponding time relative to occurrence of the trigger event,
        detecting that the user equipment is approaching a communication coverage edge of a wireless communication coverage area corresponding to a wireless communication service, and
        generating a lost connection time estimate for the user equipment, wherein the lost connection time estimate provides an estimated amount of time before the user equipment loses contact with the wireless communication service.

2. The system of claim 1, wherein the power allocation command instructs the user equipment to suspend execution of a shut-down routine for powering off the user equipment until after the user equipment attempts to report the location of the user equipment.

3. The system of claim 1, wherein the operations further comprise generating a device trail map that presents reported locations of the user equipment since the trigger event occurred.

4. The system of claim 1, wherein the operations further comprise detecting that the user equipment is no longer receiving the wireless communication service.

5. The system of claim 4, wherein the operations further comprise generating a designated contact communication that informs a target device that the user equipment is no longer receiving the wireless communication service.

6. The system of claim 5, wherein the designated contact communication authorizes the target device to access a device trail map of the user equipment that presents reported locations of the user equipment since the trigger event occurred.

7. A method comprising:
    generating, by a processor of a network device, a power allocation command directed to a user equipment, wherein the power allocation command instructs the user equipment to report a location of the user equipment in response to a trigger event associated with the user equipment;
    providing, by the processor, the power allocation command to the user equipment;
    generating, by the processor, an access point configuration message that instructs a network access point to temporarily withhold providing queued messages to the user equipment until the location of the user equipment is reported;
    receiving, by the processor, a reported location of the user equipment, wherein the reported location indicates the location of the user equipment at a corresponding time relative to occurrence of the trigger event;
    detecting, by the processor, that the user equipment is approaching a communication coverage edge of a wireless communication coverage area corresponding to a wireless communication service; and
    generating, by the processor, a lost connection time estimate for the user equipment, wherein the lost connection time estimate provides an estimated amount of time before the user equipment loses contact with the wireless communication service.

8. The method of claim 7, wherein the trigger event corresponds to at least one of an invocation of a shut-down routine on the user equipment, the user equipment approaching the communication coverage edge, or the user equipment indicating a power level that is below a power threshold.

9. The method of claim 7, further comprising generating, by the processor, a device trail map that presents reported locations of the user equipment since the trigger event occurred.

10. The method of claim 7, further comprising detecting, by the processor, that the user equipment is no longer receiving the wireless communication service.

11. The method of claim 10, further comprising generating, by the processor, a designated contact communication that informs a target device that the user equipment is no longer receiving the wireless communication service.

12. The method of claim 11, wherein the designated contact communication authorizes the target device to access a device trail map of the user equipment that presents reported locations of the user equipment since the trigger event occurred.

13. A computer storage medium having computer-executable instructions stored thereon that, in response to execution by a processor, causes the processor to perform operations comprising:
generating a power allocation command directed to a user equipment, wherein the power allocation command instructs the user equipment to report a location of the user equipment in response to a trigger event associated with the user equipment;
providing the power allocation command to the user equipment;
generating an access point configuration message that instructs a network access point to temporarily withhold providing queued messages to the user equipment until the location of the user equipment is reported;
receiving a reported location of the user equipment, wherein the reported location indicates the location of the user equipment at a corresponding time relative to occurrence of the trigger event;
detecting that the user equipment is approaching a communication coverage edge of a wireless communication coverage area corresponding to a wireless communication service; and
generating a lost connection time estimate for the user equipment, wherein the lost connection time estimate provides an estimated amount of time before the user equipment loses contact with the wireless communication service.

14. The computer storage medium of claim 13, wherein the trigger event corresponds to at least one of an invocation of a shut-down routine on the user equipment, the user equipment approaching the communication coverage edge, or the user equipment indicating a power level that is below a power threshold.

15. The computer storage medium of claim 13, wherein the operations further comprise generating a device trail map that presents reported locations of the user equipment since the trigger event occurred.

16. The computer storage medium of claim 13, wherein the operations further comprise detecting that the user equipment is no longer receiving the wireless communication service.

17. The computer storage medium of claim 16, further comprising generating a designated contact communication that informs a target device that the user equipment is no longer receiving the wireless communication service.

18. The computer storage medium of claim 17, wherein the designated contact communication authorizes the target device to access a device trail map of the user equipment that presents reported locations of the user equipment since the trigger event occurred.

* * * * *